US012744591B2

(12) United States Patent
Suh et al.

(10) Patent No.: US 12,744,591 B2
(45) Date of Patent: Sep. 22, 2026

(54) METHOD AND DEVICE FOR UPLINK COMMUNICATION IN NON-TERRESTRIAL NETWORK

(71) Applicants: Hyundai Motor Company, Seoul (KR); Kia Corporation, Seoul (KR)

(72) Inventors: Young Kil Suh, Hwaseong (KR); Gene Back Hahn, Hwaseong (KR); Ui Hyun Hong, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 261 days.

(21) Appl. No.: 18/812,136

(22) Filed: Aug. 22, 2024

(65) Prior Publication Data

US 2024/0413896 A1 Dec. 12, 2024

Related U.S. Application Data

(63) Continuation of application No. PCT/KR2023/002585, filed on Feb. 23, 2023.

(30) Foreign Application Priority Data

Feb. 24, 2022 (KR) ........................ 10-2022-0024447

(51) Int. Cl.
*H04W 24/00* (2009.01)
*H04B 7/185* (2006.01)
(Continued)

(52) U.S. Cl.
CPC ...... *H04B 7/18541* (2013.01); *H04W 52/367* (2013.01)

(58) Field of Classification Search
CPC ............ H04B 7/18513; H04B 7/18541; H04B 17/336; H04B 17/373; H04B 7/185;
(Continued)

(56) References Cited

U.S. PATENT DOCUMENTS

2020/0295824 A1 9/2020 Charbit et al.
2021/0203411 A1 7/2021 Hultman et al.
(Continued)

FOREIGN PATENT DOCUMENTS

EP 3 955 476 A1 2/2022
WO 2021/198723 A1 10/2021

OTHER PUBLICATIONS

IP.com search History (Year: 2026).*
Orbit.com search History (Year: 2026).*

*Primary Examiner* — Moustapha Diaby
(74) *Attorney, Agent, or Firm* — Fox Rothschild LLP

(57) ABSTRACT

A method and a device are configured for uplink communication in a non-terrestrial network. The method of operating a base station includes steps performed by a processor of the base station, including: predicting a first length of a feeder link between the base station and a satellite connected to the base station; predicting a second length of a service link between the satellite and a terminal connected to the satellite; predicting a first communication quality for the feeder link by considering the first length; predicting a second communication quality for the service link by considering the second length; generating scheduling information on the basis of the first communication quality and the second communication quality; transmitting the scheduling information to the terminal via the satellite; and performing uplink communication with the terminal on the basis of the scheduling information.

20 Claims, 16 Drawing Sheets

(51) Int. Cl.
*H04W 52/00* (2009.01)
*H04W 52/36* (2009.01)
*H04W 56/00* (2009.01)
*H04W 72/21* (2023.01)
*H04W 84/00* (2009.01)

(58) Field of Classification Search
CPC ........... H04B 7/18517; H04B 7/18519; H04W 52/367; H04W 72/542; H04W 72/21; H04W 72/232; H04W 72/23; H04W 24/08; H04W 36/0055; H04W 56/00; H04W 72/1268; H04W 84/06
See application file for complete search history.

(56) References Cited

U.S. PATENT DOCUMENTS

| | | | | |
|---|---|---|---|---|
| 2021/0227481 | A1* | 7/2021 | Xu | H04B 7/18504 |
| 2021/0273717 | A1 | 9/2021 | Wigard et al. | |
| 2022/0182132 | A1* | 6/2022 | Hirai | H04B 17/345 |
| 2023/0388007 | A1* | 11/2023 | Löhr | H04B 7/18547 |
| 2025/0071687 | A1* | 2/2025 | Zhu | H04W 52/14 |

* cited by examiner

FIG. 2A 240
data network
230
feeder link
212
ISL
feeder link
beam foot print
211
service link
220

400a
410
data source
411
transmission processor
412
TX MIMO processor
413a
MOD
DEMOD
414a
414t
413t
MOD
DEMOD
415
memory
416
controller
417
scheduler
418
data sink
419
reception processor
420
MIMO detector
400b
460
data sink
461
reception processor
462
MIMO detector
463a
DEMOD
MOD
464a
464r
463r
DEMOD
MOD
465
memory
466
controller
467
data source
468
transmission processor
469
TX MIMO processor

FIG. 6A

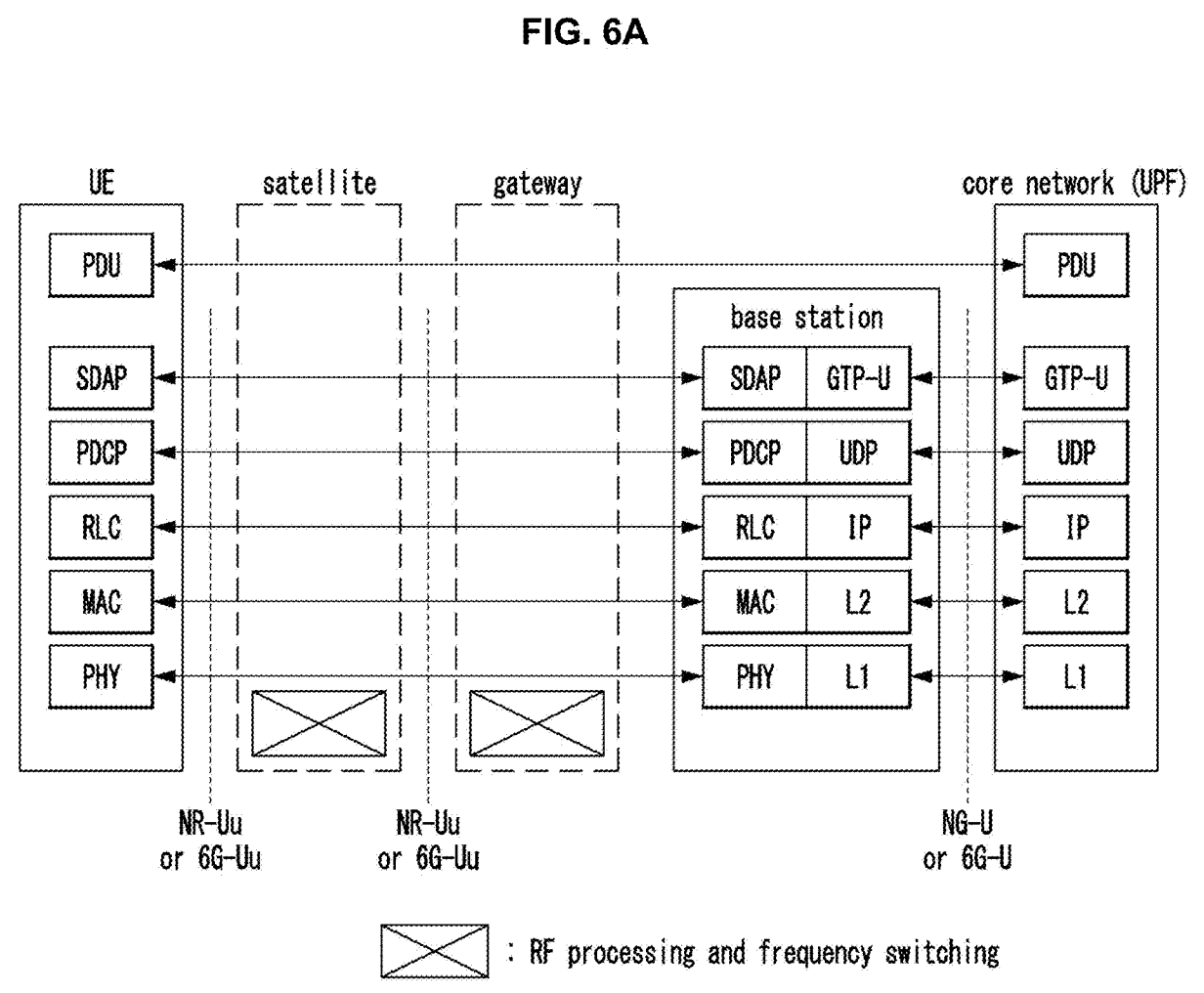

UE
PDU
SDAP
PDCP
RLC
MAC
PHY satellite gateway base station
SDAP
PDCP
RLC
MAC
PHY
GTP-U
UDP
IP
L2
L1 core network (UPF)
PDU
GTP-U
UDP
IP
L2
L1

NR-Uu or 6G-Uu

NR-Uu or 6G-Uu

NG-U or 6G-U

: RF processing and frequency switching

FIG. 6B

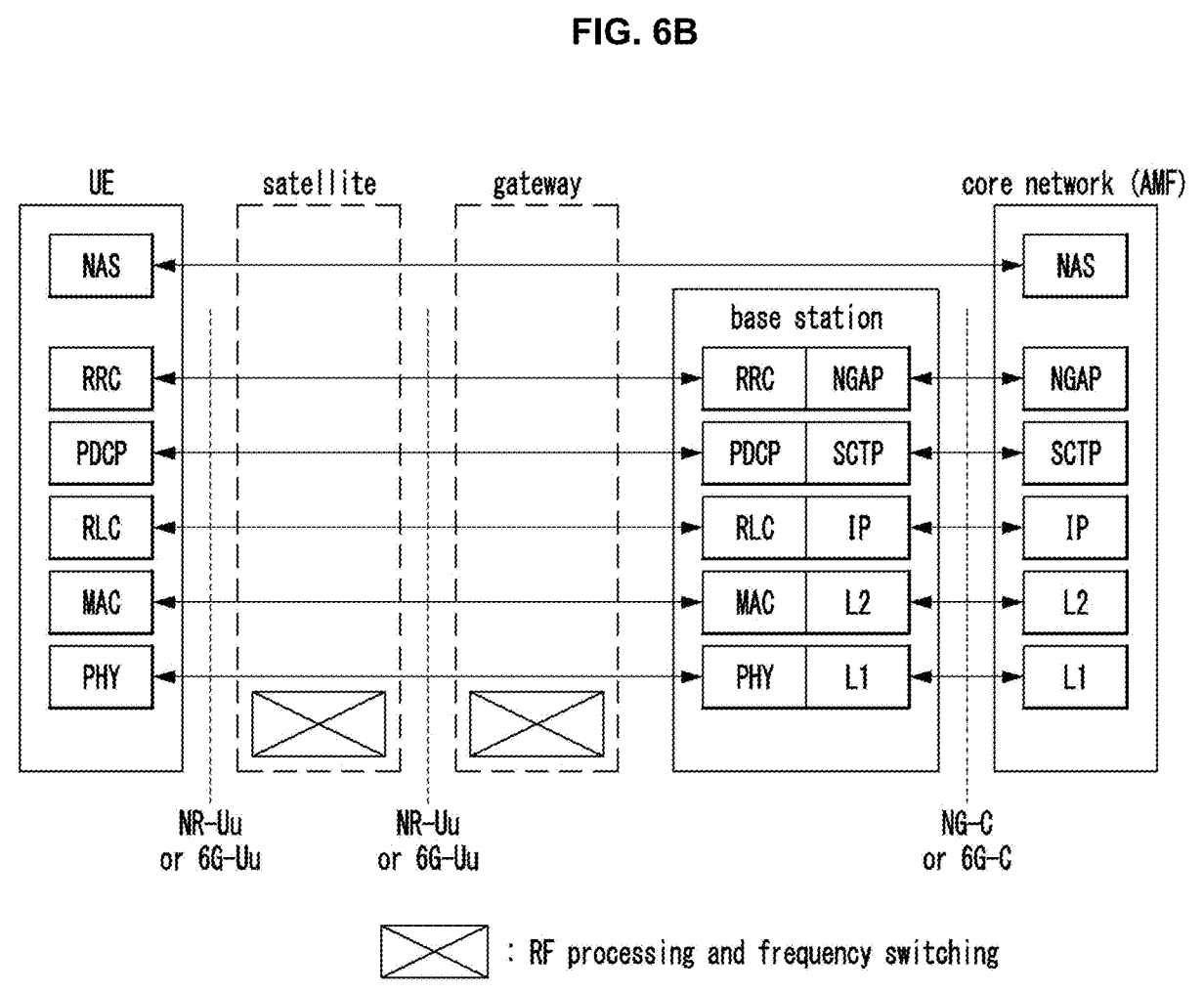

UE
NAS
RRC
PDCP
RLC
MAC
PHY satellite gateway base station
RRC NGAP
PDCP SCTP
RLC IP
MAC L2
PHY L1 core network (AMF)
NAS
NGAP
SCTP
IP
L2
L1

NR-Uu or 6G-Uu
NR-Uu or 6G-Uu
NG-C or 6G-C

: RF processing and frequency switching

FIG. 7B

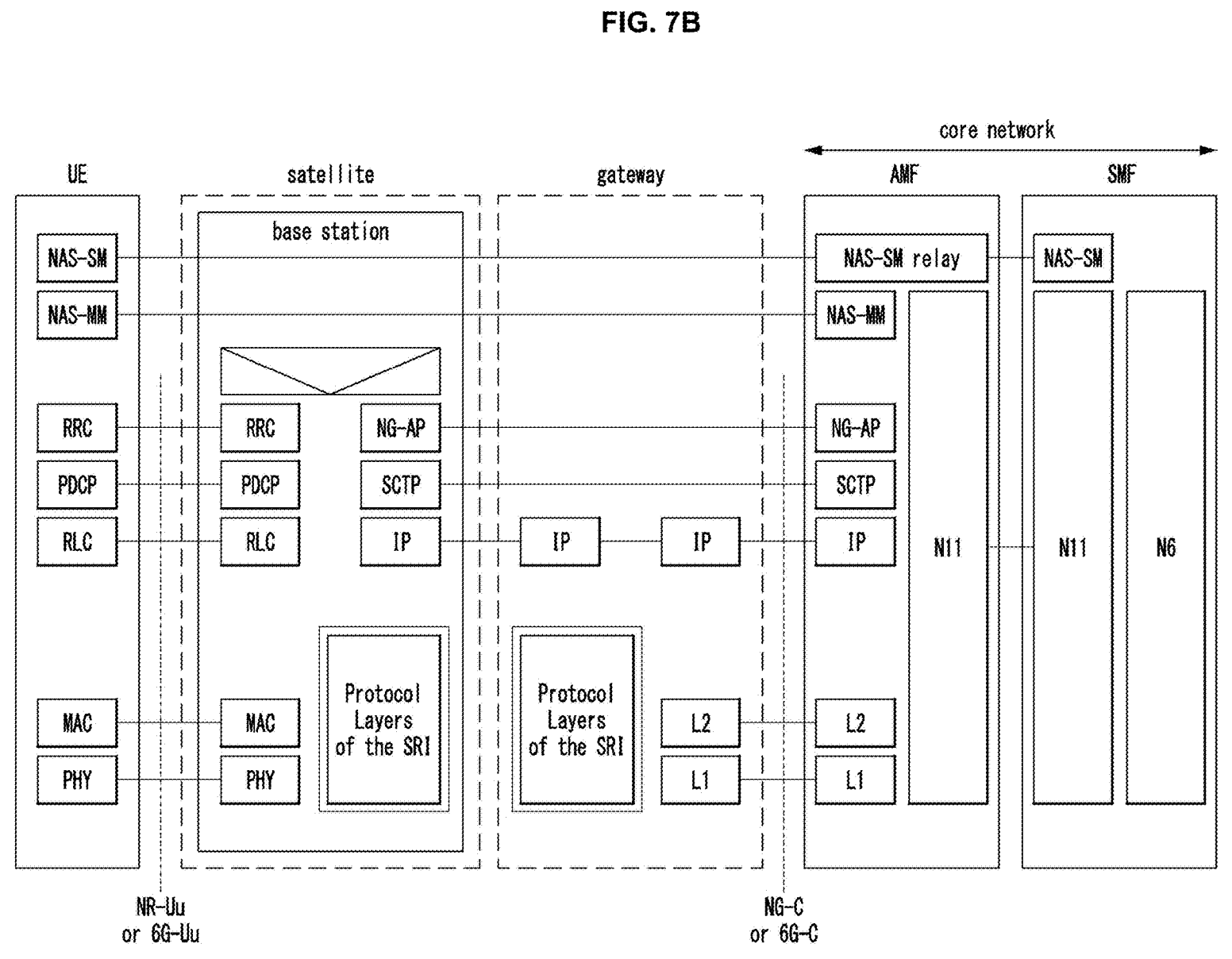

UE
NAS-SM
NAS-MM
RRC
PDCP
RLC
MAC
PHY

NR-Uu or 6G-Uu satellite
base station
RRC
PDCP
RLC
MAC
PHY
NG-AP
SCTP
IP
Protocol Layers of the SRI gateway
IP
IP
L2
L1
Protocol Layers of the SRI NG-C or 6G-C core network
AMF
NAS-SM relay
NAS-MM
NG-AP
SCTP
IP
L2
L1
N11

SMF
NAS-SM
N11
N6 transmission time of signaling information (reference time T0)
DL frame (base station)
DL frame (terminal)
UL frame (base station)
UL frame (terminal)
3+8
3+11
repeated 16 times
repeated 12 times
repeated 8 times
time

METHOD AND DEVICE FOR UPLINK COMMUNICATION IN NON-TERRESTRIAL NETWORK

CROSS-REFERENCE TO RELATED APPLICATIONS

The present application is a continuation of International Application No. PCT/KR2023/002585 filed on Feb. 23, 2023, which claims under 35 U.S.C. § 119 (a) the benefit of Korean Patent Application No. 10-2022-0024447 filed on Feb. 24, 2022, the entire contents of which are incorporated by reference herein.

BACKGROUND

(a) Technical Field

The present disclosure relates to an uplink communication technique in a non-terrestrial network, and more particularly, to a repeated transmission technique in uplink.

(b) Description of the Related Art

A communication network (e.g., 5G communication network, 6G communication network, etc.) to provide enhanced communication services compared to the existing communication network (e.g., long term evolution (LTE), LTE-Advanced (LTA-A), etc.) is being developed. The 5G communication network (e.g., new radio (NR) communication network) can support not only a frequency band of 6 GHz or below, but also a frequency band of 6 GHz or above. That is, the 5G communication network can support a frequency range (FR1) band and/or FR2 band. The 5G communication network can support various communication services and scenarios compared to the LTE communication network. For example, usage scenarios of the 5G communication network may include enhanced Mobile BroadBand (eMBB), Ultra Reliable Low Latency Communication (URLLC), Massive Machine Type Communication (mMTC), and the like.

The 6G communication network can support a variety of communication services and scenarios compared to the 5G communication network. The 6G communication networks can meet the requirements of hyper-performance, hyper-bandwidth, hyper-space, hyper-precision, hyper-intelligence, and/or hyper-reliability. The 6G communication networks can support various and wide frequency bands and can be applied to various usage scenarios (e.g., terrestrial communication, non-terrestrial communication, sidelink communication, and the like).

The communication network (e.g., 5G communication network, 6G communication network, etc.) may provide communication services to terminals located on the ground. Recently, the demand for communication services for not only terrestrial but also non-terrestrial airplanes, drones, and satellites has been increasing, and for this purpose, technologies for a non-terrestrial network (NTN) have been discussed. The non-terrestrial network may be implemented based on 5G communication technology, 6G communication technology, and/or the like. For example, in the non-terrestrial network, communication between a satellite and a terrestrial communication node or a non-terrestrial communication node (e.g., airplane, drone, or the like) may be performed based on 5G communication technology, 6G communication technology, and/or the like. In the NTN, the satellite may perform functions of a base station in a communication network (e.g., 5G communication network, 6G communication network, and/or the like).

Meanwhile, a physical distance between a terminal and a base station in a non-terrestrial network may be longer than a physical distance between a terminal and a base station in a terrestrial network. In non-terrestrial networks, a path loss may be significant, and latency may be long. In non-terrestrial networks, a transmit power limit for uplink communication from a transmitter (e.g., terminal) may be higher than a transmit power limit for downlink communication from a transmitter (e.g., base station). Additionally, due to the long latency, it may not be easy to exchange control messages (e.g., control information) in real-time between the base station and the terminal. Therefore, methods to address the aforementioned issues are necessary.

SUMMARY

The present disclosure is directed to providing a method and an apparatus for uplink communication in a non-terrestrial network (NTN).

A method of operating a base station, according to a first exemplary embodiment of the present disclosure for achieving the above-described objective, may comprise: predicting, by a processor of the base station, a first length of a feeder link between the base station and a satellite connected to the base station; predicting, by the processor, a second length of a service link between the satellite and a terminal connected to the satellite; predicting, by the processor, a first communication quality for the feeder link considering the first length; predicting, by the processor, a second communication quality for the service link considering the second length; generating, by the processor, scheduling information based on the first communication quality and the second communication quality; transmitting, by the processor, the scheduling information to the terminal through the satellite; and performing, by the processor, uplink communication with the terminal based on the scheduling information.

The method may further comprise: receiving indication information of a maximum transmit power of the terminal in an initial access procedure for the terminal, wherein the indication information may indicate a transmit power section configured by the base station or a type of the terminal.

The method may further comprise: receiving, from another base station, a handover request message including indication information of the maximum transmit power of the terminal in a handover procedure for the terminal, wherein the indication information may indicate a transmit power section configured by the base station or a type of the terminal.

The first length for one or more time periods may be predicted based on ephemeris information of the satellite, and the second length for the one or more time period may be predicted based on at least one of the ephemeris information of the satellite or location information of the terminal.

The scheduling information may be generated for each time period, at least one of the first communication quality or the second communication quality may be changed for each time period, first scheduling information for a first time period may be generated based on the first communication quality and the second communication quality in the first time period, and second scheduling information for a second time period after the first time period may be generated based on the first communication quality and the second communication quality in the second time period.

The first communication quality may be predicted further considering at least one of a noise level at the base station, a noise level at the satellite, or a third length of a new feeder link between the satellite and a new base station.

The second communication quality may be predicted further considering at least one of the maximum transmit power of the terminal, a polarization loss between the satellite and the terminal, or a noise level at the satellite.

The scheduling information may include at least one of information on a time period, information of a number of repetitions for uplink transmission, uplink resource allocation information, demodulation reference signal (DMRS) information, modulation and coding scheme (MCS) information, or information on an uplink transmission periodicity.

The base station, the satellite, and the terminal may belong to a transparent payload-based non-terrestrial network.

A method of operating a terminal, according to a second exemplary embodiment of the present disclosure for achieving the above-described objective, may comprise: transmitting, by a processor of the terminal, to a base station and through a satellite, information indicating a maximum transmit power of the terminal; receiving, by the processor, from the base station and through the satellite, scheduling information generated based on communication qualities predicted considering a first length of a feeder link between the base station and the satellite connected to the base station, a second length of a service link between the satellite and the terminal connected to the satellite, and the maximum transmit power; and performing, by the processor, uplink communication with the base station based on the scheduling information.

The scheduling information may be generated for each time period, the communication qualities are changed for each time period, first scheduling information for a first time period may be generated based on the communication qualities in the first time period, and second scheduling information for a second time period after the first time period may be generated based on the communication qualities in the second time period.

The communication quality between the base station and the satellite may be predicted further considering at least one of a noise level at the base station, a noise level at the satellite, or a third length of a new feeder link between the satellite and a new base station, and the communication quality between the satellite and the terminal may be predicted further considering at least one of the maximum transmit power of the terminal, a polarization loss between the satellite and the terminal, or a noise level at the satellite.

The scheduling information may include at least one of information on a time period, information of a number of repetitions for uplink transmission, uplink resource allocation information, demodulation reference signal (DMRS) information, modulation and coding scheme (MCS) information, or information on an uplink transmission periodicity.

A base station, according to a third exemplary embodiment of the present disclosure for achieving the above-described objective, may comprise a processor, and the processor may cause the base station to perform: predicting, by the processor, a first length of a feeder link between the base station and a satellite connected to the base station; predicting, by the processor, a second length of a service link between the satellite and a terminal connected to the satellite; predicting, by the processor, a first communication quality for the feeder link considering the first length; predicting, by the processor, a second communication quality for the service link considering the second length; generating, by the processor, scheduling information based on the first communication quality and the second communication quality; transmitting, by the processor, the scheduling information to the terminal through the satellite; and performing, by the processor, uplink communication with the terminal based on the scheduling information.

The processor may further cause the base station to perform: receiving indication information of a maximum transmit power of the terminal, wherein the indication information may be received in an initial access procedure or a handover procedure for the terminal.

The first length for one or more time periods may be predicted based on ephemeris information of the satellite, and the second length for the one or more time period may be predicted based on at least one of the ephemeris information of the satellite or location information of the terminal.

The scheduling information may be generated for each time period, at least one of the first communication quality or the second communication quality may be changed for each time period, first scheduling information for a first time period may be generated based on the first communication quality and the second communication quality in the first time period, and second scheduling information for a second time period after the first time period may be generated based on the first communication quality and the second communication quality in the second time period.

The first communication quality may be predicted further considering at least one of a noise level at the base station, a noise level at the satellite, or a third length of a new feeder link between the satellite and a new base station.

The second communication quality may be predicted further considering at least one of the maximum transmit power of the terminal, a polarization loss between the satellite and the terminal, or a noise level at the satellite.

The scheduling information may include at least one of information on a time period, information of a number of repetitions for uplink transmission, uplink resource allocation information, demodulation reference signal (DMRS) information, modulation and coding scheme (MCS) information, or information on an uplink transmission periodicity.

According to the present disclosure, a base station can predict communication qualities of a service link and a feeder link over time, generate scheduling information based on the communication qualities, and transmit the scheduling information to a terminal. The terminal can perform uplink transmission based on the scheduling information received from the base station. In this case, the terminal can repeatedly perform uplink transmission. Consequently, communication performance in the non-terrestrial network can be improved.

BRIEF DESCRIPTION OF THE DRAWINGS

FIG. 2A is a conceptual diagram illustrating a third exemplary embodiment of a non-terrestrial network.

FIG. 6A is a conceptual diagram illustrating a first exemplary embodiment of a protocol stack of a user plane in a transparent payload-based non-terrestrial network.

FIG. 6B is a conceptual diagram illustrating a first exemplary embodiment of a protocol stack of a control plane in a transparent payload-based non-terrestrial network.

FIG. 7B is a conceptual diagram illustrating a first exemplary embodiment of a protocol stack of a control plane in a regenerative payload-based non-terrestrial network.

DETAILED DESCRIPTION

Figure 1A:
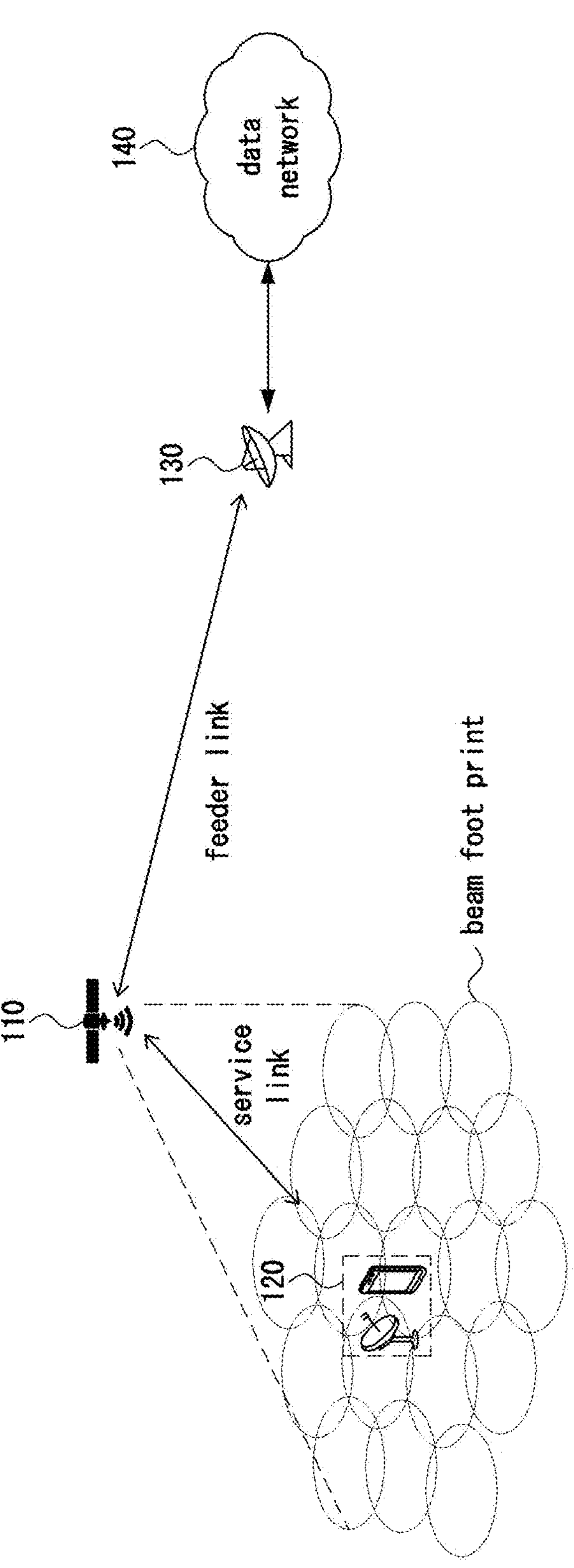
FIG. 1A is a conceptual diagram illustrating a first exemplary embodiment of a non-terrestrial network.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In the present disclosure, "(re) transmission" may refer to "transmission", "retransmission", or "transmission and retransmission", "(re) configuration" may refer to "configuration", "reconfiguration", or "configuration and reconfiguration", "(re) connection" may refer to "connection", "reconnection", or "connection and reconnection", and "(re) access" may mean "access", "re-access", or "access and re-access".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprise" and/or "include" when used herein, specify the presence of stated features, integers, steps, operations, elements, components or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. In addition to the exemplary embodiments explicitly described in the present disclosure, operations may be performed according to a combination of the exemplary embodiments, extensions of the exemplary embodiments, and/or modifications of the exemplary embodiments. Performance of some operations may be omitted, and the order of performance of operations may be changed.

Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a user equipment (UE) is described, a base station corresponding to the UE may perform an operation corresponding to the operation of the UE. Conversely, when an operation of a base station is described, a UE corresponding to the base station may perform an operation corresponding to the operation of the base station. In a non-terrestrial network (NTN) (e.g., payload-based NTN), operations of a base station may refer to operations of a satellite, and operations of a satellite may refer to operations of a base station.

The base station may refer to a NodeB, evolved NodeB (eNodeB), next generation node B (gNodeB), gNB, device, apparatus, node, communication node, base transceiver station (BTS), radio remote head (RRH), transmission reception point (TRP), radio unit (RU), road side unit (RSU), radio transceiver, access point, access node, and/or the like. The UE may refer to a terminal, device, apparatus, node, communication node, end node, access terminal, mobile terminal, station, subscriber station, mobile station, portable subscriber station, on-broad unit (OBU), and/or the like.

In the present disclosure, signaling may be at least one of higher layer signaling, medium access control (MAC) signaling, or physical (PHY) signaling. Messages used for higher layer signaling may be referred to as 'higher layer messages' or 'higher layer signaling messages'. Messages used for MAC signaling may be referred to as 'MAC messages' or 'MAC signaling messages'. Messages used for PHY signaling may be referred to as 'PHY messages' or 'PHY signaling messages'. The higher layer signaling may refer to a transmission and reception operation of system information (e.g., master information block (MIB), system information block (SIB)) and/or RRC messages. The MAC signaling may refer to a transmission and reception operation of a MAC control element (CE). The PHY signaling may refer to a transmission and reception operation of control information (e.g., downlink control information (DCI), uplink control information (UCI), and sidelink control information (SCI)).

In the present disclosure, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". In the present disclosure, "signal and/or channel" may mean a signal, a channel, or "signal and channel," and "signal" may be used to mean "signal and/or channel".

A communication system may include at least one of a terrestrial network, non-terrestrial network, 4G communication network (e.g., long-term evolution (LTE) communication network), 5G communication network (e.g., new radio (NR) communication network), or 6G communication network. Each of the 4G communications network, 5G communications network, and 6G communications network may include a terrestrial network and/or a non-terrestrial network. The non-terrestrial network may operate based on at least one communication technology among the LTE communication technology, 5G communication technology, or 6G communication technology. The non-terrestrial network may provide communication services in various frequency bands.

The communication network to which exemplary embodiments are applied is not limited to the content described below, and the exemplary embodiments may be applied to various communication networks (e.g., 4G communication network, 5G communication network, and/or 6G communication network). Here, a communication network may be used in the same sense as a communication system.

FIG. 1A is a conceptual diagram illustrating a first exemplary embodiment of a non-terrestrial network.

As shown in FIG. 1A, a non-terrestrial network (NTN) may include a satellite 110, a communication node 120, a gateway 130, a data network 140, and the like. A unit including the satellite 110 and the gateway 130 may correspond to a remote radio unit (RRU). The NTN shown in FIG. 1A may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS). A non-GEO satellite may be an LEO satellite and/or MEO satellite.

The communication node 120 may include a communication node (e.g., a user equipment (UE) or a terminal) located on a terrestrial site and a communication node (e.g., an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical or circular.

In the non-terrestrial network, three types of service links can be supported as follows.

- Earth-fixed: a service link may be provided by beam(s) that continuously cover the same geographic area at all times (e.g., geosynchronous orbit (GSO) satellite).
  - quasi-earth-fixed: a service link may be provided by beam(s) covering one geographical area during a limited period and provided by beam(s) covering another geographical area during another period (e.g., non-GSO (NGSO) satellite forming steerable beams).
- earth-moving: a service link may be provided by beam(s) moving over the Earth's surface (e.g., NGSO satellite forming fixed beams or non-steerable beams).

The communication node 120 may perform communications (e.g., downlink communication and uplink communication) with the satellite 110 using 4G communication technology, 5G communication technology, and/or 6G communication technology. The communications between the satellite 110 and the communication node 120 may be performed using an NR-Uu interface and/or 6G-Uu interface. When dual connectivity (DC) is supported, the communication node 120 may be connected to other base stations (e.g., base stations supporting 4G, 5G, and/or 6G functionality) as well as the satellite 110, and perform DC operations based on the techniques defined in 4G, 5G, and/or 6G technical specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface, a 6G-Uu interface, or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the 4G communication technology, 5G communication technology, and/or 6G communication technology. For example, the core network may include an access and mobility management function (AMF), a user plane function (UPF), a session management function (SMF), and the like. The communications between the gateway 130 and the core network may be performed based on an NG-C/U interface or 6G-C/U interface.

Figure 1B:
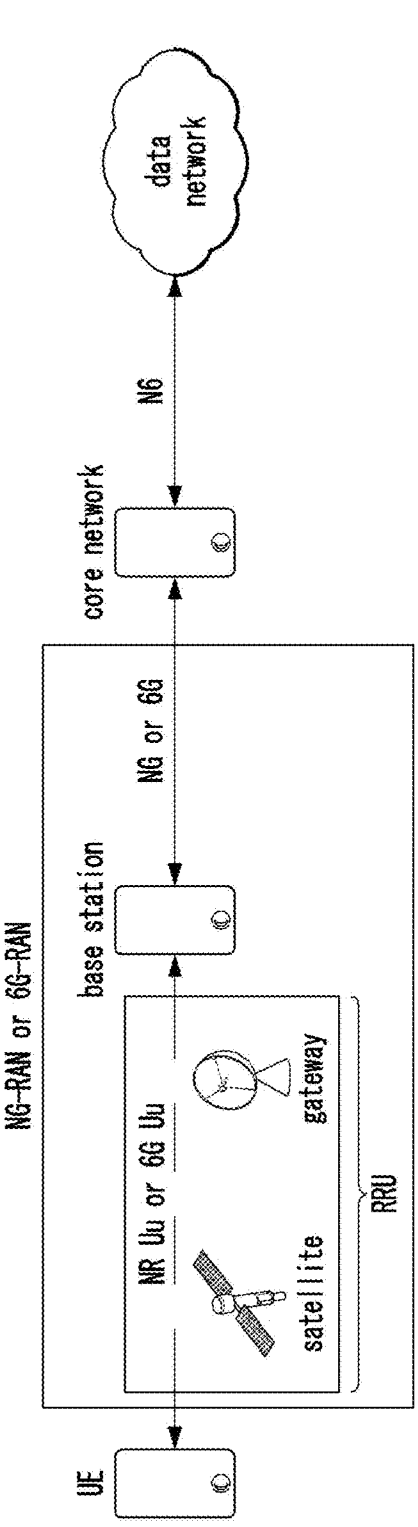
FIG. 1B is a conceptual diagram illustrating a second exemplary embodiment of a non-terrestrial network.

As shown in an exemplary embodiment of FIG. 1B, there may be a 'core network' between the gateway 130 and the data network 140 in a transparent payload-based NTN.

FIG. 1B is a conceptual diagram illustrating a second exemplary embodiment of a non-terrestrial network.

As shown in FIG. 1B, the gateway may be connected with the base station, the base station may be connected with the core network, and the core network may be connected with the data network. Each of the base station and core network may support the 4G communication technology, 5G communication technology, and/or 6G communication technology. The communications between the gateway and the base station may be performed based on an NR-Uu interface or 6G-Uu interface, and the communications between the base station and the core network (e.g., AMF, UPF, SMF, and the like) may be performed based on an NG-C/U interface or 6G-C/U interface.

Figure 2A:
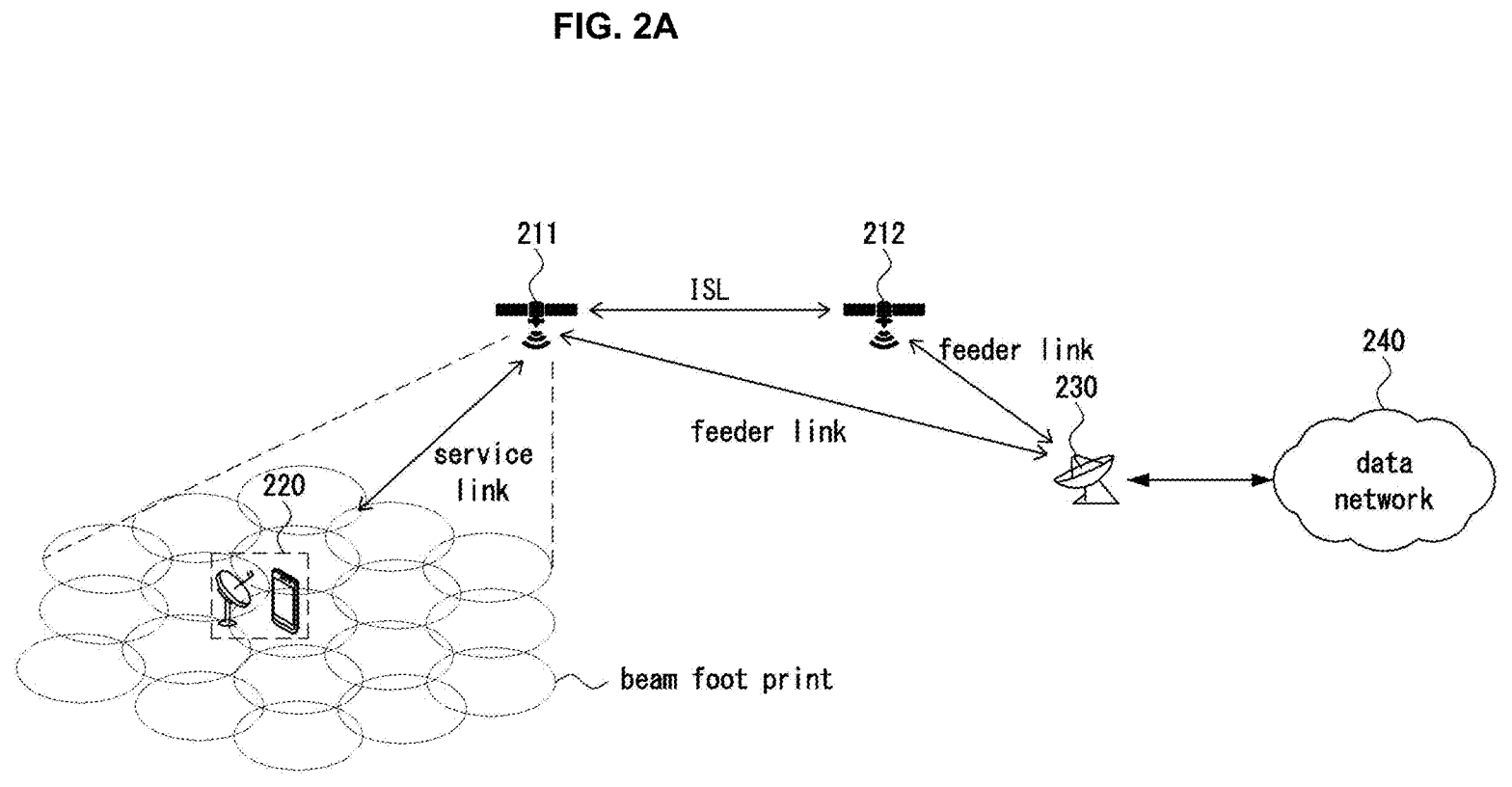

FIG. 2A is a conceptual diagram illustrating a third exemplary embodiment of a non-terrestrial network.

As shown in FIG. 2A, a non-terrestrial network may include a first satellite 211, a second satellite 212, a communication node 220, a gateway 230, a data network 240, and the like. The NTN shown in FIG. 2A may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using the 4G communication technology, 5G communication technology, and/or 6G communication technology. The communications between the satellite 211 and the communication node 220 may be performed using an NR-Uu interface or 6G-Uu interface. When DC is supported, the communication node 220 may be connected to other base stations (e.g., base stations supporting 4G, 5G, and/or 6G functionality) as well as the satellite 211, and may perform DC operations based on the techniques defined in 4G, 5G, and/or 6G technical specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily. The communications between each of the satellites 211 and 212 and the gateway 230 may be performed based on an NR-Uu interface, a 6G-Uu interface, or an SRI. The gateway 230 may be connected to the data network 240.

Figure 2B:
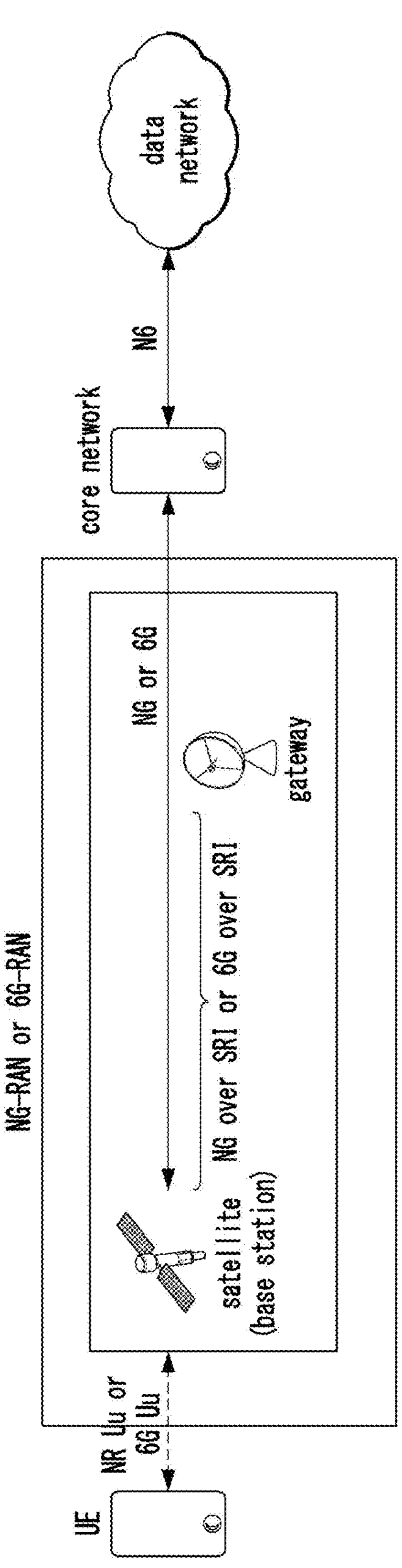
FIG. 2B is a conceptual diagram illustrating a fourth exemplary embodiment of a non-terrestrial network.
Figure 2C:
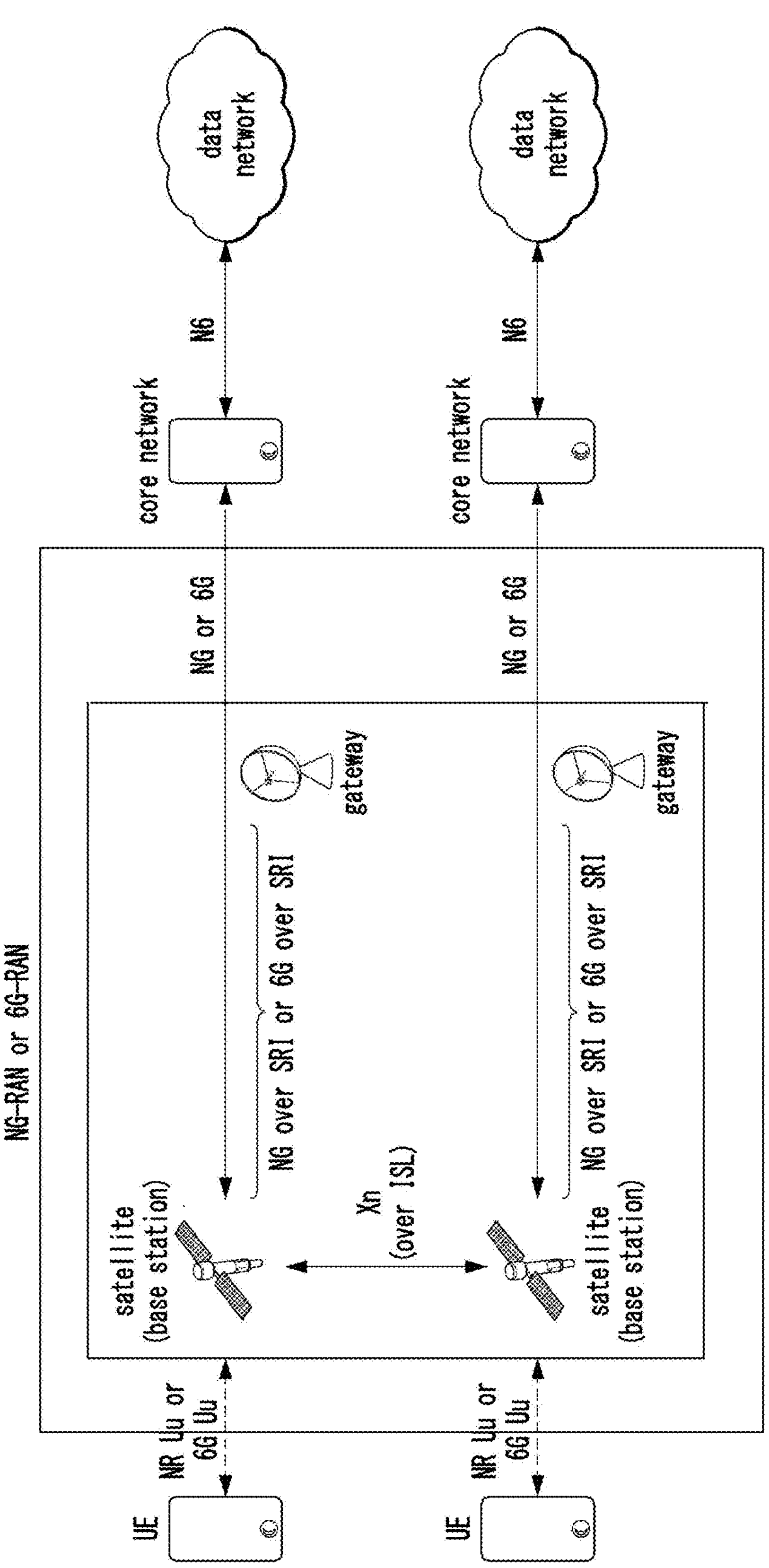
FIG. 2C is a conceptual diagram illustrating a fifth exemplary embodiment of a non-terrestrial network.

As shown in exemplary embodiments of FIG. 2B and FIG. 2C, there may be a 'core network' between the gateway 230 and the data network 240.

FIG. 2B is a conceptual diagram illustrating a fourth exemplary embodiment of a non-terrestrial network, and FIG. 2C is a conceptual diagram illustrating a fifth exemplary embodiment of a non-terrestrial network.

As shown in FIG. 2B and FIG. 2C, the gateway may be connected with the core network, and the core network may be connected with the data network. The core network may support the 4G communication technology, 5G communication technology, and/or 6G communication technology. For example. The core network may include AMF, UPF, SMF, and the like. Communication between the gateway and the core network may be performed based on an NG-C/U interface or 6G-C/U interface. Functions of a base station may be performed by the satellite. That is, the base station may be located on the satellite. A payload may be processed by the base station located on the satellite. Base stations located on different satellites may be connected to the same core network. One satellite may have one or more base stations. In the non-terrestrial network of FIG. 2B, an ISL between satellites may not be established, and in the non-terrestrial network of FIG. 2C, an ISL between satellites may be established.

Meanwhile, the entities (e.g., satellite, base station, UE, communication node, gateway, and the like) constituting the non-terrestrial network shown in FIGS. 1A, 1B, 2A, 2B, and/or 2C may be configured as follows. In the present disclosure, the entity may be referred to as a communication node.

Figure 3:
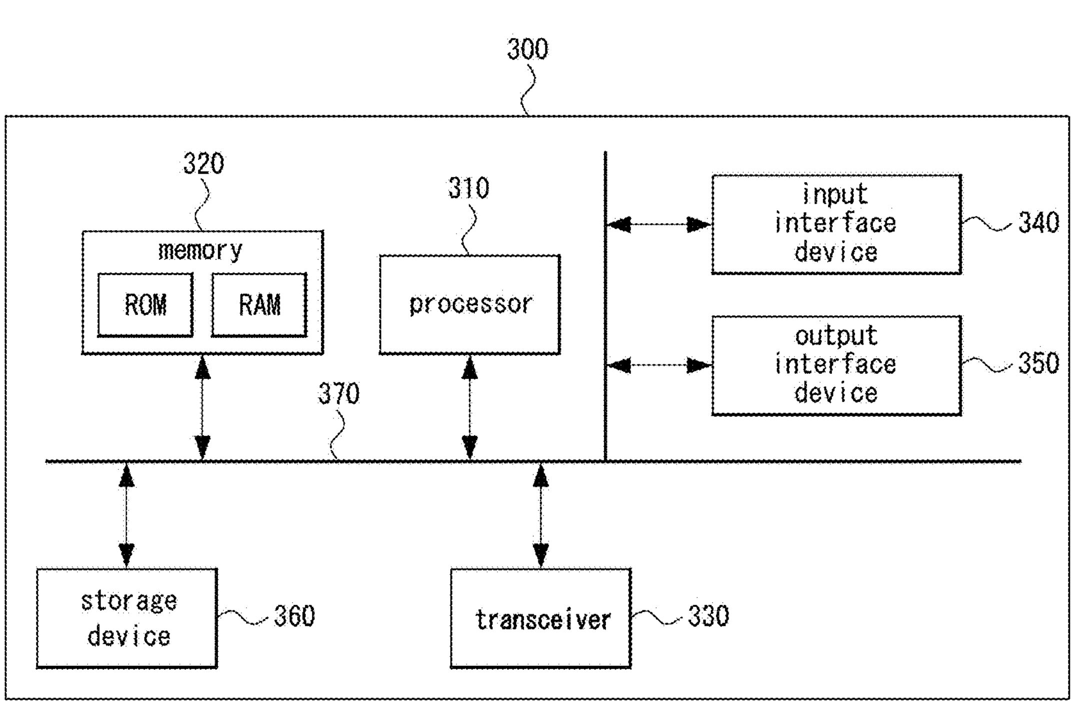
FIG. 3 is a block diagram illustrating a first exemplary embodiment of a communication node constituting a non-terrestrial network.

FIG. 3 is a block diagram illustrating a first exemplary embodiment of a communication node constituting a non-terrestrial network.

As shown in FIG. 3, a communication node 300 may include at least one processor 310, a memory 320, and a transceiver 330 connected to a network to perform communication. In addition, the communication node 300 may further include an input interface device 340, an output interface device 350, a storage device 360, and the like. The components included in the communication node 300 may be connected by a bus 370 to communicate with each other.

However, each component included in the communication node 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, communication nodes that perform communications in the communication network (e.g., non-terrestrial network) may be configured as follows. A communication node shown in FIG. 4 may be a specific exemplary embodiment of the communication node shown in FIG. 3.

Figure 4:
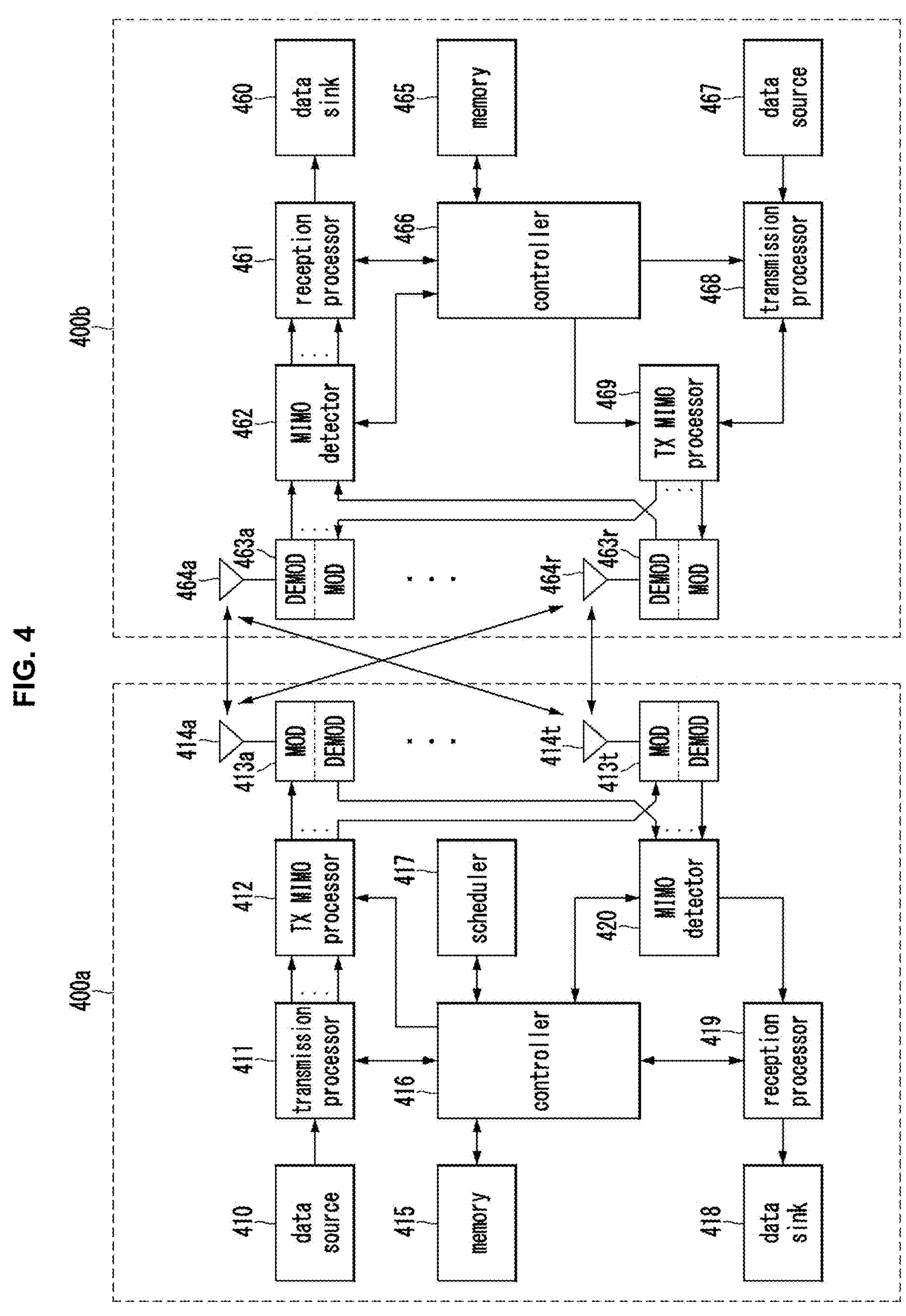
FIG. 4 is a block diagram illustrating a first exemplary embodiment of communication nodes performing communication.

FIG. 4 is a block diagram illustrating a first exemplary embodiment of communication nodes performing communication.

As shown in FIG. 4, each of a first communication node 400*a* and a second communication node 400*b* may be a base station or UE. The first communication node 400*a* may transmit a signal to the second communication node 400*b*. A transmission processor 411 included in the first communication node 400*a* may receive data (e.g., data unit) from a data source 410. The transmission processor 411 may receive control information from a controller 416. The control information may include at least one of system information, RRC configuration information (e.g., information configured by RRC signaling), MAC control information (e.g., MAC CE), or PHY control information (e.g., DCI, SCI).

The transmission processor 411 may generate data symbol (s) by performing processing operations (e.g., encoding operation, symbol mapping operation, etc.) on the data. The transmission processor 411 may generate control symbol(s) by performing processing operations (e.g., encoding operation, symbol mapping operation, etc.) on the control information. In addition, the transmission processor 411 may generate synchronization/reference symbol(s) for synchronization signals and/or reference signals.

A Tx MIMO processor 412 may perform spatial processing operations (e.g., precoding operations) on the data symbol(s), control symbol(s), and/or synchronization/reference symbol(s). An output (e.g., symbol stream) of the Tx MIMO processor 412 may be provided to modulators (MODs) included in transceivers 413*a* to 413*t*. The modulator may generate modulation symbols by performing processing operations on the symbol stream, and may generate signals by performing additional processing operations (e.g., analog conversion operations, amplification operation, filtering operation, up-conversion operation, etc.) on the modulation symbols. The signals generated by the modulators of the transceivers 413*a* to 413*t* may be transmitted through antennas 414*a* to 414*t*.

The signals transmitted by the first communication node 400*a* may be received at antennas 464*a* to 464*r* of the second communication node 400*b*. The signals received at the antennas 464*a* to 464*r* may be provided to demodulators (DEMODs) included in transceivers 463*a* to 463*r*. The demodulator (DEMOD) may obtain samples by performing processing operations (e.g., filtering operation, amplification operation, down-conversion operation, digital conversion operation, etc.) on the signals. The demodulator may perform additional processing operations on the samples to obtain symbols. A MIMO detector 462 may perform MIMO detection operations on the symbols. A reception processor 461 may perform processing operations (e.g., de-interleaving operation, decoding operation, etc.) on the symbols. An output of the reception processor 461 may be provided to a data sink 460 and a controller 466. For example, the data may be provided to the data sink 460 and the control information may be provided to the controller 466.

On the other hand, the second communication node 400*b* may transmit signals to the first communication node 400*a*. A transmission processor 469 included in the second communication node 400*b* may receive data (e.g., data unit) from a data source 467 and perform processing operations on the data to generate data symbol(s). The transmission processor 468 may receive control information from the controller 466 and perform processing operations on the control information to generate control symbol(s). In addition, the transmission processor 468 may generate reference symbol(s) by performing processing operations on reference signals.

A Tx MIMO processor 469 may perform spatial processing operations (e.g., precoding operations) on the data symbol(s), control symbol(s), and/or reference symbol(s). An output (e.g., symbol stream) of the Tx MIMO processor 469 may be provided to modulators (MODs) included in the transceivers 463*a* to 463*t*. The modulator may generate modulation symbols by performing processing operations on the symbol stream, and may generate signals by performing additional processing operations (e.g., analog conversion operation, amplification operation, filtering operation, up-conversion operations) on the modulation symbols. The signals generated by the modulators of the transceivers 463*a* to 463*t* may be transmitted through the antennas 464*a* to 464*t*.

The signals transmitted by the second communication node 400*b* may be received at the antennas 414*a* to 414*r* of the first communication node 400*a*. The signals received at the antennas 414*a* to 414*r* may be provided to demodulators (DEMODs) included in the transceivers 413*a* to 413*r*. The demodulator may obtain samples by performing processing operations (e.g., filtering operation, amplification operation, down-conversion operation, digital conversion operation) on the signals. The demodulator may perform additional processing operations on the samples to obtain symbols. A MIMO detector 420 may perform a MIMO detection operation on the symbols. The reception processor 419 may perform processing operations (e.g., de-interleaving operation, decoding operation, etc.) on the symbols. An output of the reception processor 419 may be provided to a data sink 418 and the controller 416. For example, the data may be provided to the data sink 418 and the control information may be provided to the controller 416.

Memories 415 and 465 may store the data, control information, and/or program codes. A scheduler 417 may perform scheduling operations for communication. The processors 411, 412, 419, 461, 468, and 469 and the controllers 416 and 466 shown in FIG. 4 may be the processor 310 shown in FIG. 3, and may be used to perform methods described in the present disclosure.

Figure 5A:
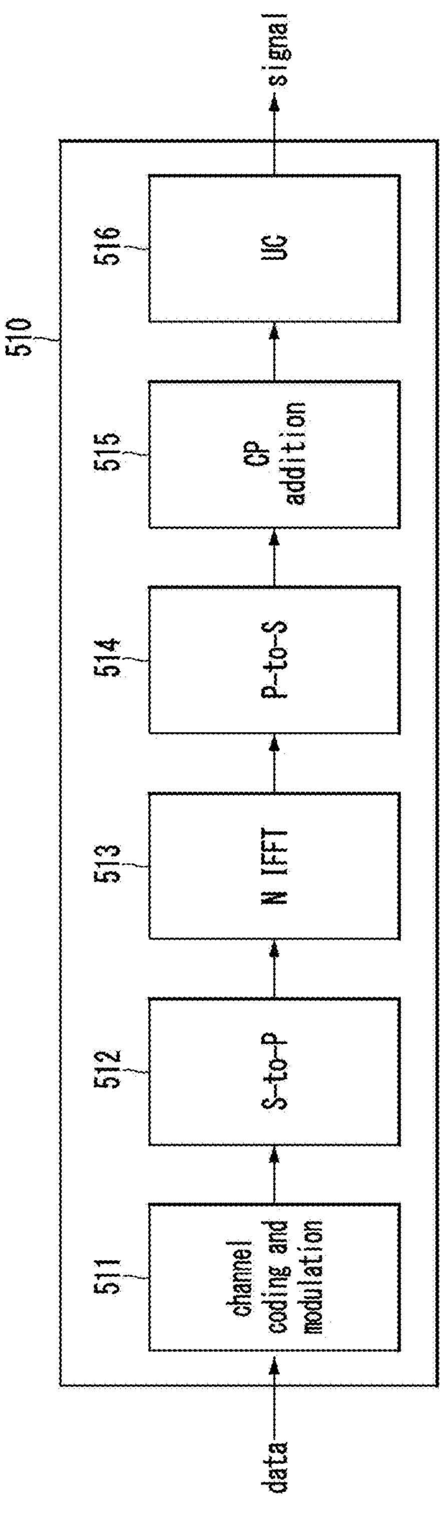
FIG. 5A is a block diagram illustrating a first exemplary embodiment of a transmission path.
Figure 5B:
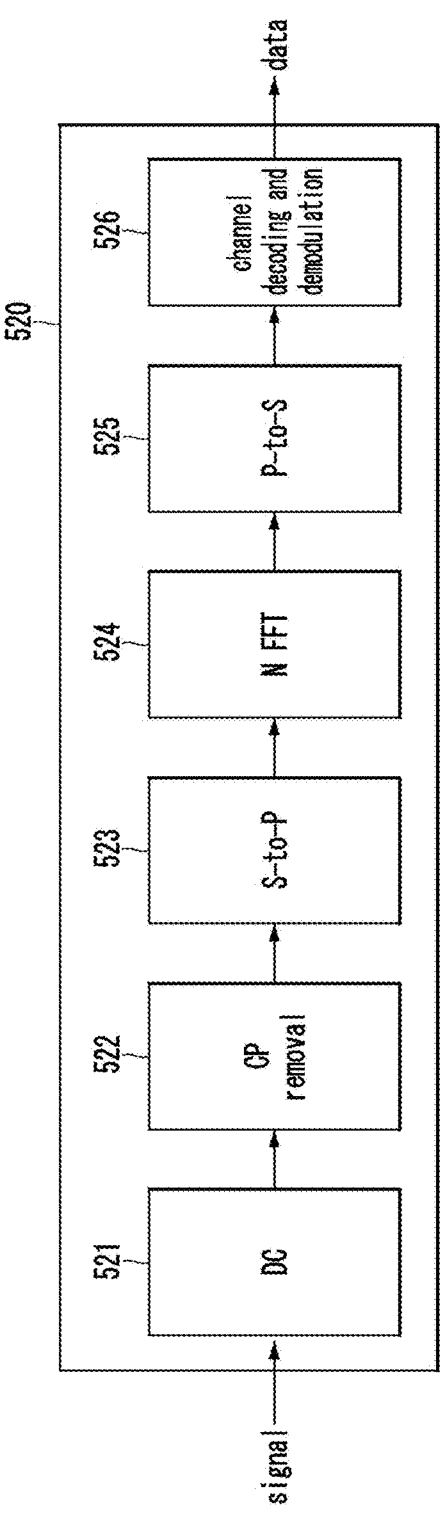
FIG. 5B is a block diagram illustrating a first exemplary embodiment of a reception path.

FIG. 5A is a block diagram illustrating a first exemplary embodiment of a transmission path, and FIG. 5B is a block diagram illustrating a first exemplary embodiment of a reception path.

As shown in FIGS. 5A and 5B, a transmission path 510 may be implemented in a communication node that transmits signals, and a reception path 520 may be implemented in a communication node that receives signals. The transmission path 510 may include a channel coding and modulation block 511, a serial-to-parallel (S-to-P) block 512, an N-point inverse fast Fourier transform (N-point IFFT) block 513, a parallel-to-serial (P-to-S) block 514, a cyclic prefix (CP) addition block 515, and up-converter (UC) 516. The reception path 520 may include a down-converter (DC) 521, a CP removal block 522, an S-to-P block 523, an N-point FFT block 524, a P-to-S block 525, and a channel decoding and demodulation block 526. Here, N may be a natural number.

In the transmission path 510, information bits may be input to the channel coding and modulation block 511. The channel coding and modulation block 511 may perform a coding operation (e.g., low-density parity check (LDPC) coding operation, polar coding operation, etc.) and a modulation operation (e.g., Quadrature Phase Shift Keying (OPSK), Quadrature Amplitude Modulation (QAM), etc.) on the information bits. An output of the channel coding and modulation block 511 may be a sequence of modulation symbols.

The S-to-P block 512 may convert frequency domain modulation symbols into parallel symbol streams to generate N parallel symbol streams. N may be the IFFT size or the FFT size. The N-point IFFT block 513 may generate time domain signals by performing an IFFT operation on the N parallel symbol streams. The P-to-S block 514 may convert the output (e.g., parallel signals) of the N-point IFFT block 513 to serial signals to generate the serial signals.

The CP addition block 515 may insert a CP into the signals. The UC 516 may up-convert a frequency of the output of the CP addition block 515 to a radio frequency (RF) frequency. Further, the output of the CP addition block 515 may be filtered in baseband before the up-conversion.

The signal transmitted from the transmission path 510 may be input to the reception path 520. Operations in the reception path 520 may be reverse operations for the operations in the transmission path 510. The DC 521 may down-convert a frequency of the received signals to a baseband frequency. The CP removal block 522 may remove a CP from the signals. The output of the CP removal block 522 may be serial signals. The S-to-P block 523 may convert the serial signals into parallel signals. The N-point FFT block 524 may generate N parallel signals by performing an FFT algorithm. The P-to-S block 525 may convert the parallel signals into a sequence of modulation symbols. The channel decoding and demodulation block 526 may perform a demodulation operation on the modulation symbols and may restore data by performing a decoding operation on a result of the demodulation operation.

In FIGS. 5A and 5B, discrete Fourier transform (DFT) and inverse DFT (IDFT) may be used instead of FFT and IFFT. Each of the blocks (e.g., components) in FIGS. 5A and 5B may be implemented by at least one of hardware, software, or firmware. For example, some blocks in FIGS. 5A and 5B may be implemented by software, and other blocks may be implemented by hardware or a combination of hardware and software. In FIGS. 5A and 5B, one block may be subdivided into a plurality of blocks, a plurality of blocks may be integrated into one block, some blocks may be omitted, and blocks supporting other functions may be added.

Meanwhile, NTN reference scenarios may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1A and/or FIG. 1B is a GEO satellite (e.g., a GEO satellite that supports a transparent function), this may be referred to as 'scenario A'. When the satellites 211 and 212 in the NTN shown in FIG. 2A, FIG. 2B, and/or FIG. 2C are GEO satellites (e.g., GEOs that support a regenerative function), this may be referred to as 'scenario B'.

When the satellite 110 in the NTN shown in FIG. 1A and/or FIG. 1B is an LEO satellite with steerable beams, this may be referred to as 'scenario C1'. When the satellite 110 in the NTN shown in FIG. 1A and/or FIG. 1B is an LEO satellite having beams moving with the satellite, this may be referred to as 'scenario C2'. When the satellites 211 and 212 in the NTN shown in FIG. 2A, FIG. 2B, and/or FIG. 2C are LEO satellites with steerable beams, this may be referred to as 'scenario D1'. When the satellites 211 and 212 in the NTN shown in FIG. 2A, FIG. 2B, and/or FIG. 2C are LEO satellites having beams moving with the satellites, this may be referred to as 'scenario D2'.

Parameters for the NTN reference scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD) | Scenario A: 541.46 ms (service and feeder links) | Scenario C: (transparent payload: service and feeder links) |

TABLE 2-continued

| | Scenarios A and B | Scenarios C and D |
|---|---|---|
| (only propagation delay) | Scenario B: 270.73 ms (only service link) | −5.77 ms (altitude of 600 km) −41.77 ms (altitude of 1,200 km) Scenario D: (regenerative payload: only service link) −12.89 ms (altitude of 600 km) −20.89 ms (altitude of 1,200 km) |
| Maximum differential delay within a cell | 10.3 ms | 3.12 ms (altitude of 600 km) 3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

FIG. 6A is a conceptual diagram illustrating a first exemplary embodiment of a protocol stack of a user plane in a transparent payload-based non-terrestrial network, and FIG. 6B is a conceptual diagram illustrating a first exemplary embodiment of a protocol stack of a control plane in a transparent payload-based non-terrestrial network.

As shown in FIGS. 6A and 6B, user data may be transmitted and received between a UE and a core network (e.g., UPF), and control data (e.g., control information) may be transmitted and received between the UE and the core network (e.g., AMF). Each of the user data and the control data may be transmitted and received through a satellite and/or gateway. The protocol stack of the user plane shown in FIG. 6A may be applied identically or similarly to a 6G communication network. The protocol stack of the control plane shown in FIG. 6B may be applied identically or similarly to a 6G communication network.

Figure 7A:
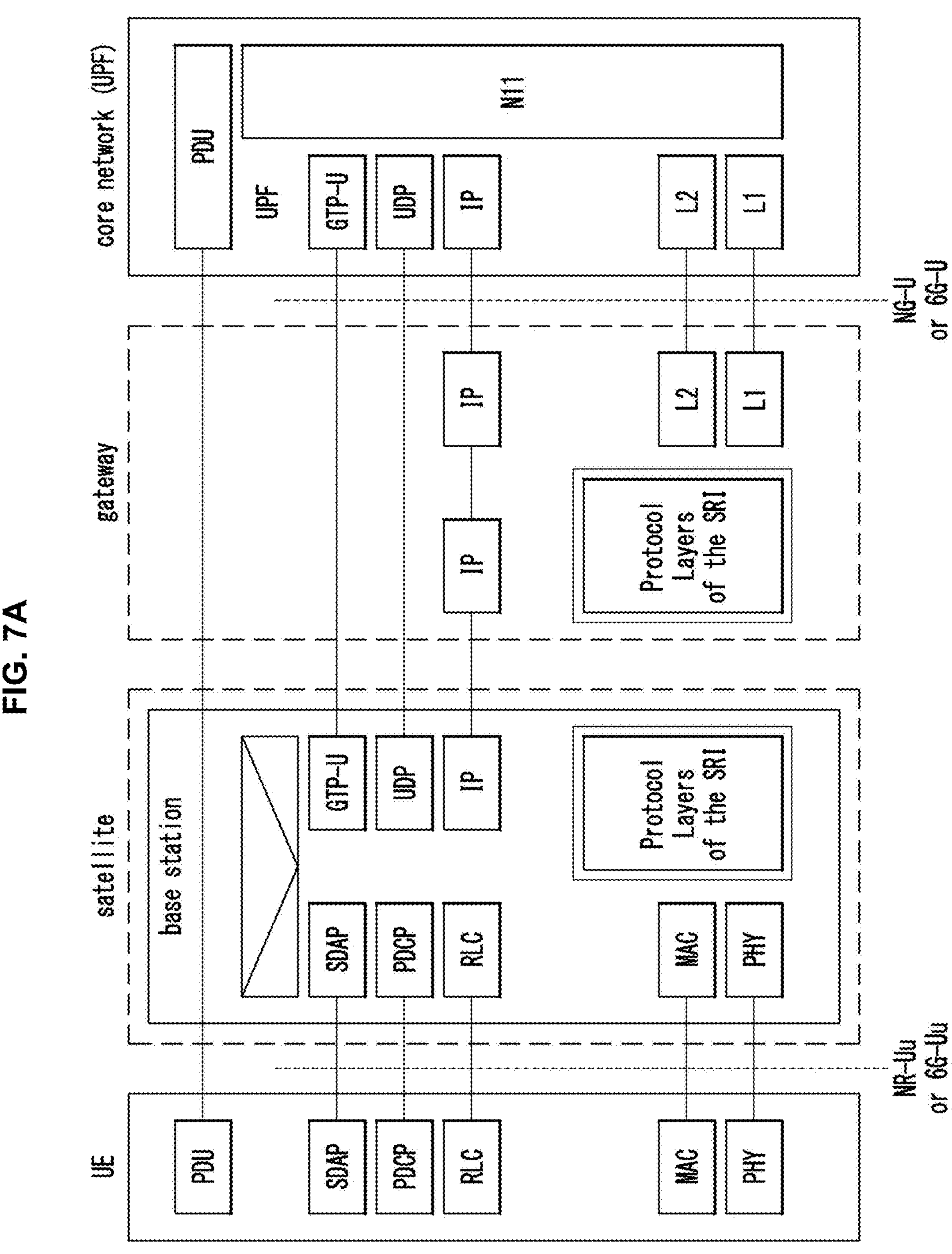
FIG. 7A is a conceptual diagram illustrating a first exemplary embodiment of a protocol stack of a user plane in a regenerative payload-based non-terrestrial network.

FIG. 7A is a conceptual diagram illustrating a first exemplary embodiment of a protocol stack of a user plane in a regenerative payload-based non-terrestrial network, and FIG. 7B is a conceptual diagram illustrating a first exemplary embodiment of a protocol stack of a control plane in a regenerative payload-based non-terrestrial network.

As shown in FIGS. 7A and 7B, each of user data and control data (e.g., control information) may be transmitted and received through an interface between a UE and a satellite (e.g., base station). The user data may refer to a user protocol data unit (PDU). A protocol stack of a satellite radio interface (SRI) may be used to transmit and receive the user data and/or control data between the satellite and a gateway. The user data may be transmitted and received through a general packet radio service (GPRS) tunneling protocol (GTP)-U tunnel between the satellite and a core network.

Meanwhile, in a non-terrestrial network, a base station may transmit system information (e.g., SIB19) including satellite assistance information for NTN access. A UE may receive the system information (e.g., SIB19) from the base station, identify the satellite assistance information included in the system information, and perform communication (e.g., non-terrestrial communication) based on the satellite assistance information. The SIB19 may include information element(s) defined in Table 4 below.

TABLE 4

```
SIB19-r17 ::= SEQUENCE {
  ntn-Config-r17          NTN-Config-r17
  t-Service-r17           INTEGER(0..549755813887)
  referenceLocation-r17       ReferenceLocation-r17
  distanceThresh-r17        INTEGER(0..65525)
  ntn-NeighCellConfigList-r17      NTN-NeighCellConfigList-r17
  lateNonCriticalExtension     OCTET STRING
  ...,
  [[
  ntn-NeighCellConfigListExt-v1720     NTN-NeighCellConfigList-r17
  ]]
}
NTN-NeighCellConfigList-r17 ::=          SEQUENCE (SIZE(1..maxCellNTN-r17)) OF
NTN-NeighCellConfig-r17
    NTN-NeighCellConfig-r17 ::=                    SEQUENCE {
    ntn-Config-r17              NTN-Config-r17
    carrierFreq-r17             ARFCN-ValueNR
    physCellId-r17              PhysCellId
}
```

NTN-Config defined in Table 4 may include information element(s) defined in Table 5 below.

TABLE 5

```
NTN-Config-r17 ::=                    SEQUENCE {
  epochTime-r17                       EpochTime-r17
  ntn-UlSyncValidityDuration-r17 ENUMERATED{ s5, s10, s15, s20, s25, s30, s35, s40,
s45, s50, s55, s60, s120, s180, s240, s900}
  cellSpecificKoffset-r17             INTEGER(1..1023)
  kmac-r17                      INTEGER(1..512)
  ta-Info-r17                   TA-Info-r17
  ntn-PolarizationDL-r17                      ENUMERATED {rhcp,lhcp,linear}
  ntn-PolarizationUL-r17                      ENUMERATED {rhcp,lhcp,linear}
  ephemerisInfo-r17                   EphemerisInfo-r17
  ta-Report-r17                 ENUMERATED {enabled}
  ...
}
EpochTime-r17 ::=                     SEQUENCE {
  sfn-r17                       INTEGER(0..1023),
  subFrameNR-r17                      INTEGER(0..9)
}
TA-Info-r17 ::=                 SEQUENCE {
  ta-Common-r17                       INTEGER(0..66485757),
  ta-CommonDrift-r17                          INTEGER(-257303..257303)
  ta-CommonDriftVariant-r17                         INTEGER(0..28949)
}
```

EphemerisInfo defined in Table 5 may include information element(s) defined in Table 6 below.

TABLE 6

```
EphemerisInfo-r17 ::=           CHOICE {
  positionVelocity-r17           PositionVelocity-r17,
  orbital-r17             Orbital-r17
}
PositionVelocity-r17 ::=        SEQUENCE {
  positionX-r17                PositionStateVector-r17,
  positionY-r17                PositionStateVector-r17,
  positionZ-r17                PositionStateVector-r17,
  velocityVX-r17                VelocityStateVector-r17,
  velocityVY-r17                VelocityStateVector-r17,
  velocityVZ-r17                VelocityStateVector-r17
}
Orbital-r17 ::=           SEQUENCE {
  semiMajorAxis-r17                   INTEGER (0..8589934591),
  eccentricity-r17             INTEGER (0..1048575),
  periapsis-r17           INTEGER (0..268435455),
  longitude-r17                INTEGER (0..268435455),
  inclination-r17              INTEGER (-67108864..67108863),
  meanAnomaly-r17                     INTEGER (0..268435455)
}
PositionStateVector-r17 ::= INTEGER (-33554432..33554431)
VelocityStateVector-r17 ::= INTEGER (-131072..131071)
```

Figure 8:
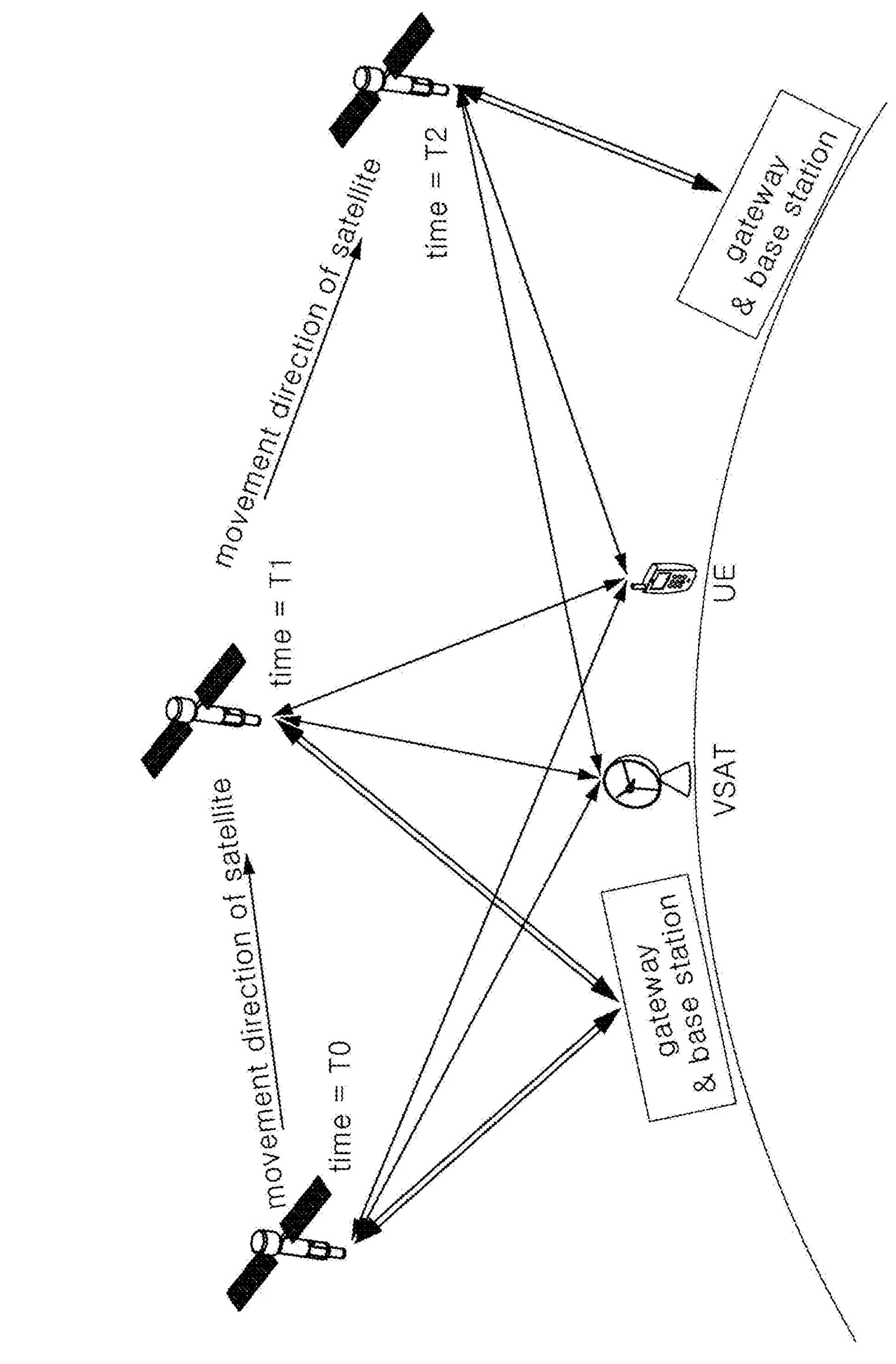
FIG. 8 is a conceptual diagram illustrating a first exemplary embodiment of changes in service links and feeder links according to movement of a satellite.

FIG. 8 is a conceptual diagram illustrating a first exemplary embodiment of changes in service links and feeder links according to movement of a satellite.

As shown in FIG. 8, a satellite may move over time (e.g., T0→T1→T2), and depending on the movement of the satellite, a length (e.g., propagation distance) of a service link between a terminal and the satellite and/or a length of a feeder link between the satellite and a gateway (e.g., base station) may vary. The base station may be switched according to the movement of the satellite. In the present disclosure, the terminal may mean a UE and/or a very small aperture terminal (VSAT). The exemplary embodiment of FIG. 8 may be applied to a transparent payload-based NTN and/or a regenerative payload-based NTN.

In an uplink communication procedure, a quality of a signal received at the base station may be determined based on a transmit power of the terminal, a channel state between the terminal and the satellite (e.g., service link state), and/or a channel state between the satellite and the base station (e.g., feeder link state). At a time T1, the distance between the satellite and the terminal may be relatively short. In other words, the service link between the satellite and the terminal may be relatively short. In this case, a quality of a received signal at the base station may be expected to be relatively high. Here, the feeder link may not be considered. At a time T2, the distance between the satellite and the terminal may be relatively long. In other words, the service link between the satellite and the terminal may be relatively long. In this case, a quality of a received signal at the base station may be expected to be relatively low.

Since changes in qualities of received signals are predictable in the NTN, the base station may allocate or configure resources for terminal(s) by considering the change in the qualities of received signals. The base station may generate uplink scheduling information (e.g., the number of repetitions for uplink transmission and/or uplink resources), and signal the uplink scheduling information to the terminal. The uplink scheduling information may be determined by considering one or more characteristics listed in Table 7 below.

TABLE 7

| | Description |
|---|---|
| Characteristic 1 | The base station may obtain information on a beam pair between the satellite and the terminal, and identify a location of the terminal based on the information on the beam pair. Alternatively, the terminal may identify its location based on a global navigation satellite system (GNSS), and transmit information on its location to the base station. The base station may identify the location of the terminal based on the information received from the terminal. |
| Characteristic 2 | The base station may obtain ephemeris information of the satellite. |
| Characteristic 3 | The base station may identify a length of each of the service link and the feeder link based on the characteristics 1 and 2. |
| Characteristic 4 | In the NTN, a channel is assumed to be in a line of sight (LOS) environment. |
| Characteristic 5 | The maximum transmit power $P_{max}$ of the terminal vary depending on a type (e.g., VSAT, UE, etc.) of the terminal. |

TABLE 7-continued

| | Description |
|---|---|
| Characteristic 6 | The base station may identify a time point at which the base station connected to the satellite switches based on the characteristic 2, and identify a feeder link (e.g., length of the feeder link) between the satellite and a new base station. |

Figure 9:
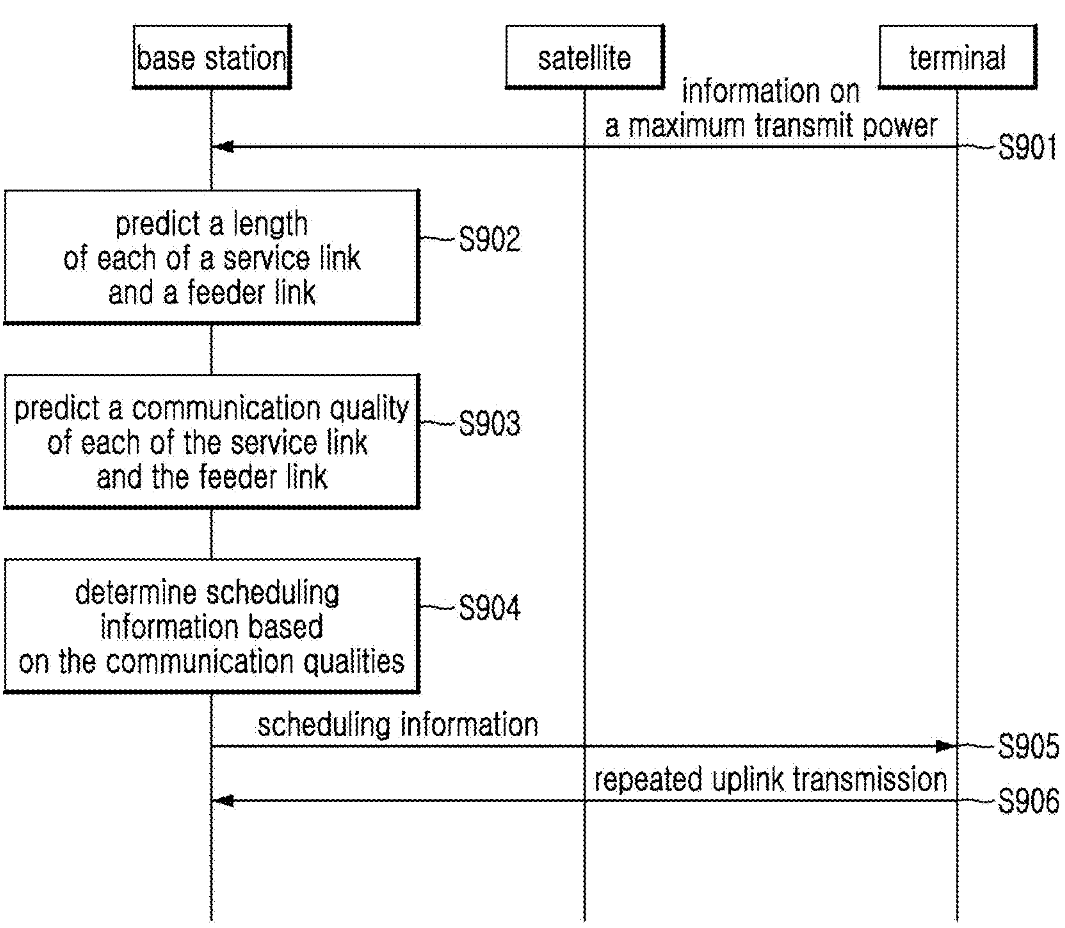
FIG. 9 is a sequence chart illustrating a first exemplary embodiment of an uplink communication method in a non-terrestrial network.

FIG. 9 is a sequence chart illustrating a first exemplary embodiment of an uplink communication method in a non-terrestrial network.

As shown in FIG. 9, a non-terrestrial network may include a base station, satellite, and terminal. The terminal may be a UE or VSAT. The exemplary embodiment of FIG. 9 may be applied to a transparent payload-based NTN. A feeder link may be established between the base station and the satellite, and a service link may be established between the satellite and the terminal. The satellite may perform a function of relaying communication between the base station and the terminal. Signals/channels of the terminal may be transmitted to the base station through the service link and the feeder link. In other words, the terminal transmitting a signal/channel to the base station may mean that the signal/channel of the terminal is delivered to the base station through the satellite. Signals/channels of the base station may be transmitted to the terminal through the feeder link and the service link. In other words, the base station transmitting a signal/channel to the terminal may mean that the signal/channel of the base station is delivered to the terminal through the satellite. In the present disclosure, a signal/channel may mean a signal and/or channel.

The terminal may transmit information on a maximum transmit power $P_{max}$ of the terminal to the base station (S901). The maximum transmit power may vary depending on a type of terminal. A maximum transmit power of a VSAT may be greater than a maximum transmit power of a UE. The base station may receive the information on the maximum transmit power from the terminal. The terminal may transmit information on the maximum transmit power in an initial access procedure or handover procedure. In the handover procedure, a target base station may receive information on the maximum transmit power of the terminal from the terminal or a source base station. The information on the maximum transmit power may be included in at least one of Msg1, MsgA, Msg3, RRC message, or feedback message (e.g., uplink control information (UCI)). The feedback message may be a hybrid automatic repeat request (HARQ)-acknowledgement (ACK) message for a radio resource control (RRC) (re) configuration message. The information on the maximum transmit power of the terminal may be signaled based on method(s) below.

[Method 1]

Table 8 below (e.g., power indication table) may be shared in advance between the base station and the terminal. The maximum transmit power of the terminal may be expressed as A. The maximum transmit power may be indicated by indication information (e.g., indication bit(s)). The indication information may be configured according to a section to which the maximum transmit power belongs. $N_A$ sections may be configured, and $N_A$ indication information may respectively correspond to the $N_A$ sections. $N_A$ may be a natural number.

TABLE 8

| Maximum transmit power ($P_{max}$ = A) | Indication information |
|---|---|
| A < transmit power 1 (section 1) | 1 |
| Transmit power 1 ≤ A < transmit power 2 (section 2) | 2 |
| . . . | . . . |
| Transmit power $N_A$-1 ≤ A < transmit power $N_A$ (section $N_A$) | $N_A$ |

The terminal may identify a section to which the terminal's maximum transmit power belongs. For example, if the maximum transmit power of the terminal falls within the section 1 of Table 8, the terminal may transmit indication information indicating 1 to the base station. The base station may receive the indication information from the terminal, and may identify the section to which the maximum transmit power of the terminal belongs based on the value of the indication information. For example, if the value of the indication information is 1, the base station may determine that the maximum transmit power of the terminal belongs to the section 1. In other words, the base station may determine that the maximum transmit power of the terminal is less than the transmit power 1.

[Method 2]

Table 8 may be a power indication table, and a plurality of power indication tables may be shared between the base station and the terminal. The plurality of power indication tables may be defined in technical specifications. Alternatively, the base station may signal configuration information of the plurality of power indication tables to the terminal. Sections for maximum transmit power may be configured differently in each of the plurality of power indication tables. For example, three sections for maximum transmit power may be configured in a first power indication table, and five sections for maximum transmit power may be configured in a second power indication table.

The base station may signal information indicating one power indication table (e.g., an index of the power indication table) among the plurality of power indication tables to the terminal. For example, the base station may transmit the information indicating one power indication table to the terminal in an initial access procedure and/or RRC (re) configuration procedure. The terminal may identify the one power indication table based on the information received from the base station. The terminal may identify a section to which the maximum transmit power of the terminal belongs among sections of the one power indication table indicated by the base station, and transmit indication information corresponding to the identified section to the base station. The base station may receive the indication information from the terminal, identify the section corresponding to a value of the indication information within the one power indication table, and determine that the maximum transmit power of the terminal belongs to the identified section.

[Method 3]

The base station may signal configuration information of Table 8 (e.g., power indication table) to the terminal. The configuration information of the power indication table may include at least one of a boundary value of transmit power in each section (e.g., transmit power 1, transmit power 2, . . . , transmit power $N_A$) or indication information corresponding to each section. When the indication information is assigned as continuous integers as shown in Table 8, the configuration information may not include the indication information corresponding to each section. The terminal may receive the configuration information of the power indication table from the base station and identify the power indication table based on the configuration information.

The terminal may identify a section to which the maximum transmit power of the terminal belongs within the power indication table, and may transmit indication information corresponding to the identified section to the base station. The base station may receive the indication information from the terminal, and may determine the section to which the maximum transmit power of the terminal belongs based on a value of the indication information.

[Method 4]

Table 9 below may be shared in advance between the base station and the terminal. The maximum transmit power of the terminal may vary depending on a type of terminal. For example, the type of terminal may be classified into a low-power Internet of Thing (IoT) terminal, UE (e.g., smartphone), or VSAT. The maximum transmit power of the low-power IoT terminal may be $P_{max}$ 1, the maximum transmit power of the UE may be $P_{max}$ 2, and the maximum transmit power of the VSAT may be $P_{max}$ $N_A$. The base station may know in advance the maximum transmit power according to the type of terminal. $N_A$ may be a natural number.

TABLE 9

| Terminal type | Indication information |
|---|---|
| Low-power IoT terminal | 1 |
| UE | 2 |
| . . . | . . . |
| VSAT | $N_A$ |

For example, when the type of the terminal is UE, the terminal may transmit indication information indicating 2 to the base station. The base station may receive the indication information from the terminal, identify the type of the terminal based on the value of the indication information, and identify the maximum transmit power according to the type of the terminal. If the value of the indication information is 2, the base station may determine that the maximum transmit power of the terminal is $P_{max}$ 2 (e.g., the maximum transmit power of the UE). According to Method 4, the maximum transmit power of the terminal may be implicitly indicated to the base station.

In the above-described method(s), the size (e.g., bit width) of the indication information may be determined based on ceiling ($\log_2 N_A$). ceiling (•) may refer to a ceiling function.

Meanwhile, in the handover procedure, the base station shown in FIG. 9 may be a target base station. The terminal may transmit information (e.g., indication information) on the maximum transmit power to the target base station based on the above-described method(s). The target base station may receive the information on the maximum transmit power from the terminal. The information on the maximum transmit power may be included in at least one of Msg1, MsgA, Msg3, RRC message, or feedback message (e.g., UCI). The feedback message may be a HARQ-ACK message for an RRC (re) configuration message.

As another method, since the source base station knows the maximum transmit power of the terminal, the source base station may transmit information on the maximum transmit power of the terminal to the target base station in the handover procedure. The information on the maximum transmit power may be included in a handover request message transmitted from the source base station to the target base station. The target base station may receive the information on the maximum transmit power of the terminal from the source base station.

When the source base station and the target base station belong to a transparent payload-based NTN, a time required for the source base station to transmit information on the maximum transmit power of the terminal to the target base station may be shorter than a time required for the terminal to transmit information on the maximum transmit power of the terminal to the target base station. In this case, it may be preferable for the source base station to transmit information on the maximum transmit power of the terminal to the target base station.

When the source base station and the target base station belong to a regenerative payload-based NTN, a physical distance between the source base station and the target base station may be longer than a physical distance between the terminal and the target base station. In this case, it may be preferable for the terminal to transmit information on the maximum transmit power of the terminal to the target base station.

The base station may calculate (e.g., predict) a length of each of the service link and the feeder link according to changes in time (S902). The base station may perform the step S902 periodically. Alternatively, when a specific event occurs (e.g., according to a request of the terminal, communication state, etc.), the base station may perform the step S902. The base station may predict the length of each of the service link and the feeder link based on the satellite's location information (e.g., ephemeris information) and/or the terminal's location information. In other words, the base station may predict the length of the feeder link based on the satellite's location information, and may predict the length of the service link based on at least one of the satellite's location information or the terminal's location information.

The satellite's location information and/or the terminal's location information may be obtained based on the method (s) described above. The base station may predict the length of each of the service link and the feeder link in each period (e.g., time period) defined in Table 10 below. In the present disclosure, a unit of time t, T0, T1, T2, T3, or T4 may be an absolute time unit (e.g., millisecond (ms), second s), etc.), symbol(s), slot(s), subframe(s), and/or frame(s).

TABLE 10

| Time (t) |
|---|
| T0 < t ≤ T1 (time period 1) |
| T1 < t ≤ T2 (time period 2) |
| T2 < t ≤ T3 (time period 3) |
| T3 < t ≤ T4 (time period 4) |

The base station may predict a communication quality of the service link and/or feeder link in each period (e.g., each time period) (S903). The base station may perform the step S903 periodically. Alternatively, when a specific event occurs (e.g., according to a request of the terminal, communication state, etc.), the base station may perform the step S903. The base station may predict the communication quality of the service link and/or the feeder link based on one or more parameters (e.g., parameters predictable at the base station) defined in Table 11 below. The length of the feeder link may be used to predict the communication quality in a transparent payload-based NTN. A noise level at the satellite may be signaled from the satellite to the base station.

TABLE 11

| Parameters |
| --- |
| Maximum transmit power of the terminal |
| Polarization loss between the terminal and the satellite |
| The length of the service link according to the time |
| The length of the feeder link according to the time |
| The length of a feeder link at a time of establishing the feeder link between the satellite and a new base station |
| Noise level at the satellite and/or base station |

The base station may generate scheduling information based on the communication quality of the service link and/or feeder link at each time (S904). The scheduling information may include at least one of information on the time period, information on the number of repetitions for uplink transmission, MCS information (e.g., MCS index), frequency domain resource assignment (FDRA) information, time domain resource assignment (TDRA) information, demodulation reference signal (DMRS) information (e.g., number of DMRSs, DMRS pattern), or information on a resource allocation periodicity. The uplink transmission may be a physical uplink control channel (PUCCH) transmission, physical uplink shared channel (PUSCH) transmission, and/or physical random access channel (PRACH) transmission.

The base station may generate a scheduling table as shown in Table 12 below. The scheduling table may include scheduling information (e.g., the number of repetitions for uplink transmission and/or an end time of a time period). In Table 12, a time unit may be an absolute time (e.g., ms). TO may be a reference time and may be 0. T1 may be 80 ms, T2 may be 110 ms, T3 may be 140 ms, and T4 may be 200 ms. In Table 12, each of a period 1, period 2, period 3, and period 4 may mean a time period.

TABLE 12

| Time (t) | The number of repetitions for uplink transmission | End time of a time period |
| --- | --- | --- |
| T0 < t ≤ T1 (time period 1) (e.g., T1 = 80 ms) | Repetition $\text{factor}_{section1}$ (e.g., 16) | T1 (e.g., a time point after 8 frames from T0) |
| T1 < t ≤ T2 (time period 2) (e.g., T2 = 110 ms) | Repetition $\text{factor}_{section2}$ (e.g., 12) | T2 (e.g., a time point after 11 frames from T0) |
| T2 < t ≤ T3 (time period 3) (e.g., T3 = 140 ms) | Repetition $\text{factor}_{section3}$ (e.g., 8) | T3 (e.g., a time point after 14 frames from T0) |
| T3 < t ≤ T4 (time period 4) (e.g., T4 = 299 ms) | Repetition $\text{factor}_{section4}$ (e.g., 12) | T4 (e.g., a time point after 20 frames from T0) |

The base station may signal the scheduling information (e.g., configuration information of the scheduling table) to the satellite and/or terminal (S905). When Table 12 is used, the scheduling information may include information on the number of repetitions for uplink transmission and information on an end time of each time period. In addition, the scheduling information may further include information on a reference time (e.g., TO). The satellite may receive the scheduling information from the base station and transmit the scheduling information to the terminal. The terminal may receive the scheduling information from the satellite. The terminal may perform uplink transmission based on the base station's scheduling information (e.g., the scheduling table in Table 12) (S906). A time at which the base station transmits the scheduling information or a time at which the terminal receives the scheduling information may be considered as the reference time TO. Alternatively, the reference time TO may be indicated to the terminal by signaling from the base station.

The terminal may repeatedly perform uplink transmission depending on a time period. For example, if a current time belongs to the time period 1, the terminal may repeatedly transmit an uplink channel (e.g., PUCCH, PUSCH, and/or PRACH) 16 times. If a current time belongs to the time period 2 after the time period 1, the terminal may repeatedly transmit an uplink channel (e.g., PUCCH, PUSCH, and/or PRACH) 12 times. The satellite and/or base station may receive the uplink channel repeatedly transmitted from the terminal based on the scheduling information configured in the terminal.

Since the distance between the base station and the terminal is long, a difference between a time period at the base station and a time period at the terminal may be large. To solve this problem, based on an uplink timing of the base station, a future time point in a time period may be signaled to the terminal using an appropriate time unit.

As another method, the base station may generate scheduling information as shown in Table 13 below. A scheduling table may include the scheduling information (e.g., the number of repetitions for uplink transmission and/or a start time of a time period). In Table 13, a time unit may be an absolute time (e.g., ms). TO may be a reference time and may be 0. T1 may be 80 ms, T2 may be 110 ms, T3 may be 140 ms, and T4 may be 200 ms.

TABLE 13

| Time (t) | The number of repetitions for uplink transmission | Start time of a time period |
| --- | --- | --- |
| T0 < t ≤ T1 (time period 1) (e.g., T1 = 80 ms) | Repetition $\text{factor}_{period1}$ (e.g., 16) | |
| T1 < t ≤ T2 (time period 2) (e.g., T2 = 110 ms) | Repetition $\text{factor}_{period2}$ (e.g., 12) | T1 (e.g., a time point after 8 frames from T0) |
| T2 < t ≤ T3 (time period 3) (e.g., T3 = 140 ms) | Repetition $\text{factor}_{period3}$ (e.g., 8) | T2 (e.g., a time point after 11 frames from T0) |
| T3 < t ≤ T4 (time period 4) (e.g., T4 = 200 ms) | Repetition $\text{factor}_{period4}$ (e.g., 12) | T3 (e.g., a time point after 14 frames from T0) |

In step S905, the base station may transmit configuration information (e.g., scheduling information) of the scheduling table in Table 13 to the satellite and/or terminal. In step S906, the terminal may repeatedly transmit an uplink channel based on the scheduling table in Table 13.

Meanwhile, in the NTN, a time difference between the terminal and the base station may be large. A method of dividing uplink time periods after the terminal receives the configuration information of the scheduling table (e.g., scheduling information) from the base station may be considered.

Figure 10:
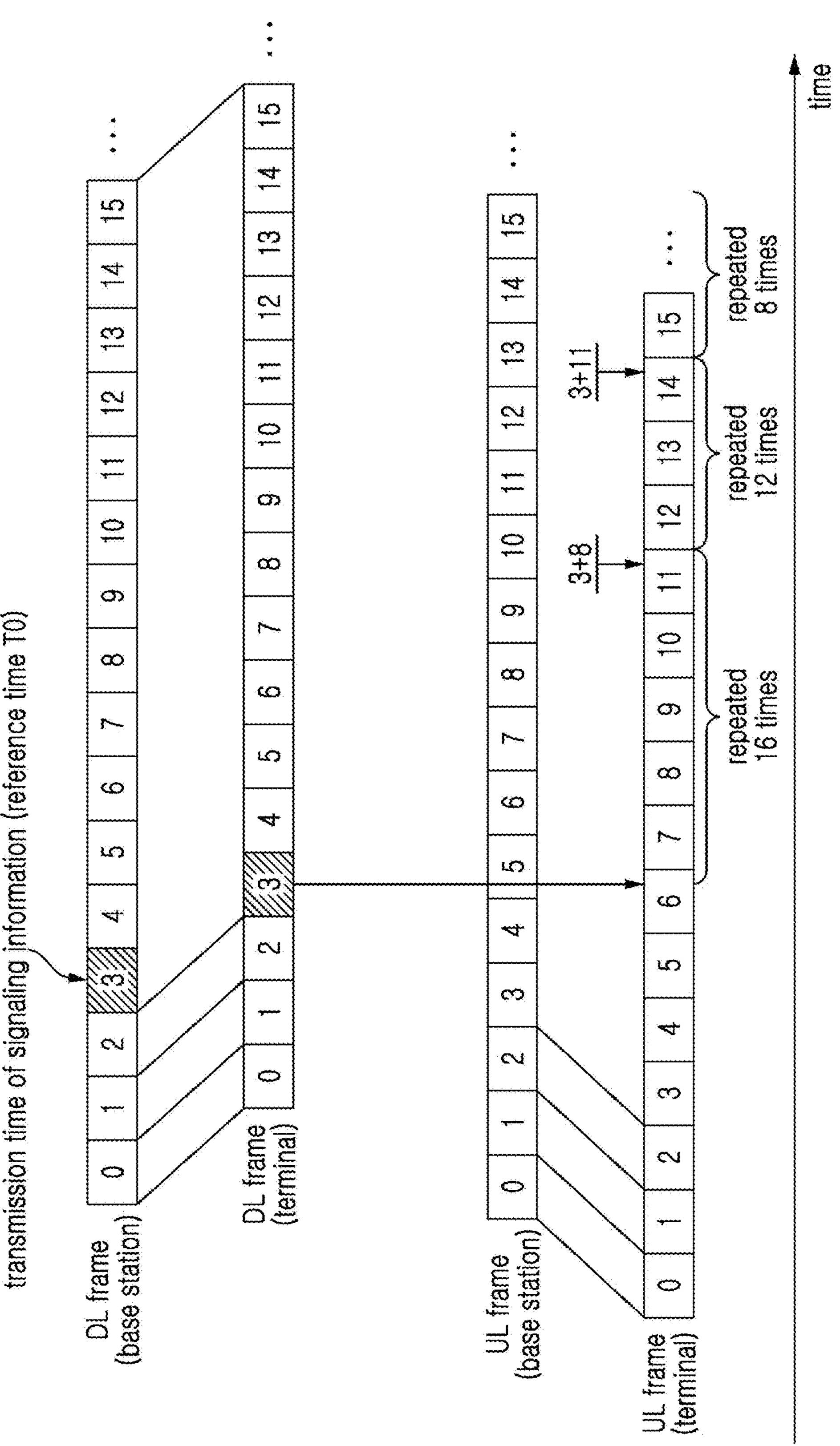
FIG. 10 is a conceptual diagram illustrating a first exemplary embodiment of the number of repetitions for uplink transmission for each time period in a non-terrestrial network.

FIG. 10 is a conceptual diagram illustrating a first exemplary embodiment of the number of repetitions for uplink transmission for each time period in a non-terrestrial network.

As shown in FIG. 10, a base station may transmit scheduling information (e.g., configuration information of a scheduling table) to a terminal in a downlink frame #3. The terminal may receive the scheduling information from the base station in the downlink frame #3. The terminal may determine that an end time of a time period 1 is an uplink frame #11 based on the scheduling information. The terminal may repeatedly transmit an uplink channel 16 times in a period from the uplink frame #6, which is a completion time of decoding the scheduling information, to the uplink frame #11 (i.e., a partial period of the time period 1). In other words, repeated uplink transmission may be performed in a portion of the time period 1. Then, the terminal may repeatedly transmit an uplink channel 12 times in a period from an uplink frame #12 to an uplink frame #14 (e.g., time period 2).

Meanwhile, in step S904, the base station may generate scheduling information including not only the number of repetitions for uplink transmission but also frequency resource allocation information (e.g., allocation information of resource blocks (RBs) for a PUSCH), DMRS information (e.g., number of PUSCH DMRSs), MCS information, and/or information on a transmission periodicity (e.g., information on a transmission periodicity or allocation periodicity of the PUSCH). In other words, the base station may generate scheduling information including one or more among information on a time period (e.g., information on a start time and/or end time of the time period), information on the number of repetitions for uplink transmission, frequency resource allocation information, DMRS information, MCS information, or information on the transmission periodicity. The base station may signal the scheduling information to the satellite and/or terminal (S905).

The satellite may receive the scheduling information from the base station, and transmit the scheduling information of the base station to the terminal. The terminal may receive the scheduling information of the base station from the satellite. The terminal may perform uplink communication based on information included in scheduling information. In other words, the terminal may identify a time period to which a current time belongs, and may perform uplink communication based on scheduling information corresponding to the identified time period (e.g., information on the number of repetitions for uplink transmission, frequency resource allocation information, DMRS information, MCS information, and/or information on the transmission periodicity).

The scheduling information may include a scheduling table in Table 14 below. The scheduling information may further include information on a start RB or an end RB. In Table 14, a start time may be indicated instead of an end time of each time period.

TABLE 14

| Time (t) | End time of a time period | The number of RBs for a PUSCH |
|---|---|---|
| T0 < t ≤ T1 (time period 1) (e.g., T1 = 80 ms) | T1 (e.g., a time point after 8 frames from T0) | 8 |
| T1 < t ≤ T2 (time period 2) (e.g., T2 = 110 ms) | T2 (e.g., a time point after 11 frames from T0) | 4 |
| T2 < t ≤ T3 (time period 3) (e.g., T3 = 140 ms) | T3 (e.g., a time point after 14 frames from T0) | 2 |
| T3 < t ≤ T4 (time period 4) (e.g., T4 = 200 ms) | T4 (e.g., a time point after 20 frames from T0) | 4 |

As another example, the scheduling information may include a scheduling table in Table 15 below. In Table 15, a start time may be indicated instead of an end time of each time period. An MCS may be used for PUSCH transmission. The MCS may be determined based on a predicted communication quality of the service link and/or feeder link.

TABLE 15

| Time (t) | End time of a time period | MCS |
|---|---|---|
| T0 < t ≤ T1 (time period 1) (e.g., T1 = 80 ms) | T1 (e.g., a time point after 8 frames from T0) | MCS 4 |
| T1 < t ≤ T2 (time period 2) (e.g., T2 = 140 ms) | T2 (e.g., a time point after 14 frames from T0) | MCS 3 |
| T2 < t ≤ T3 (time period 3) (e.g., T3 = 220 ms) | T3 (e.g., a time point after 22 frames from T0) | MCS 2 |
| T3 < t ≤ T4 (time period 4) (e.g., T4 = 340 ms) | T4 (e.g., a time point after 34 frames from T0) | MCS 3 |

As another example, the scheduling information may include a scheduling table in Table 16 below. A PUSCH DMRS may be a DMRS used for demodulation of a PUSCH. A PUSCH allocation periodicity may be expressed in units of an absolute time (ms) or frames.

TABLE 16

| End time of a time period (unit: frames) | The number of repetitions for uplink transmission | The number of RBs for a PUSCH | The number of PUSCH DMRSs | PUSCH allocation periodicity |
|---|---|---|---|---|
| 200 | 16 | 2 | 3 | 30 |
| 450 | 16 | 3 | 3 | 20 |
| 800 | 12 | 3 | 3 | 20 |
| 1500 | 8 | 3 | 2 | 20 |

As another example, the scheduling information may include a scheduling table in Table 17 below.

TABLE 17

| End time of a time period (unit: 50 frames) | The number of repetitions for uplink transmission | The number of RBs for a PUSCH | The number of PUSCH DMRSs | PUSCH allocation periodicity |
|---|---|---|---|---|
| 4 | 16 | 2 | 3 | 30 |
| 9 | 16 | 3 | 3 | 20 |
| 16 | 12 | 3 | 3 | 20 |
| 30 | 8 | 3 | 2 | 20 |

Various units may be used to represent the parameters (e.g., information elements) in the above-described scheduling tables (e.g., scheduling information). For example, a unit for representing an information element may be at least one of symbol(s), slot(s), subframe(s), frame(s), second, or millisecond (ms).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of operating a base station, comprising:

predicting, by a processor of the base station, a first length of a feeder link between the base station and a satellite connected to the base station;

predicting, by the processor, a second length of a service link between the satellite and a terminal connected to the satellite;

predicting, by the processor, a first communication quality for the feeder link considering the first length;

predicting, by the processor, a second communication quality for the service link considering the second length;

generating, by the processor, scheduling information based on the first communication quality and the second communication quality;

transmitting, by the processor, the scheduling information to the terminal through the satellite; and performing, by the processor, uplink communication with the terminal based on the scheduling information.

2. The method of claim 1, further comprising:

receiving indication information of a maximum transmit power of the terminal in an initial access procedure for the terminal, wherein the indication information indicates a transmit power section configured by the base station or a type of the terminal.

3. The method of claim 1, further comprising:

receiving, from another base station, a handover request message including indication information of the maximum transmit power of the terminal in a handover procedure for the terminal, wherein the indication information indicates a transmit power section configured by the base station or a type of the terminal.

4. The method of claim 1, wherein the first length for one or more time periods is predicted based on ephemeris information of the satellite, and the second length for the one or more time period is predicted based on at least one of the ephemeris information of the satellite or location information of the terminal.

5. The method of claim 1, wherein the scheduling information is generated for each time period, at least one of the first communication quality or the second communication quality is changed for each time period, first scheduling information for a first time period is generated based on the first communication quality and the second communication quality in the first time period, and second scheduling information for a second time period after the first time period is generated based on the first communication quality and the second communication quality in the second time period.

6. The method of claim 1, wherein the first communication quality is predicted further considering at least one of a noise level at the base station, a noise level at the satellite, or a third length of a new feeder link between the satellite and a new base station.

7. The method of claim 1, wherein the second communication quality is predicted further considering at least one of the maximum transmit power of the terminal, a polarization loss between the satellite and the terminal, or a noise level at the satellite.

8. The method of claim 1, wherein the scheduling information includes at least one of information on a time period, information of a number of repetitions for uplink transmission, uplink resource allocation information, demodulation reference signal (DMRS) information, modulation and coding scheme (MCS) information, or information on an uplink transmission periodicity.

9. The method of claim 1, wherein the base station, the satellite, and the terminal belong to a transparent payload-based non-terrestrial network.

10. A method of operating a terminal, the method comprising:

transmitting, by a processor of the terminal, to a base station and through a satellite, information indicating a maximum transmit power of the terminal;

receiving, by the processor, from the base station and through the satellite, scheduling information generated based on communication qualities predicted considering a first length of a feeder link between the base station and the satellite connected to the base station, a second length of a service link between the satellite and the terminal connected to the satellite, and the maximum transmit power; and performing, by the processor, uplink communication with the base station based on the scheduling information.

11. The method of claim 10, wherein the scheduling information is generated for each time period, the communication qualities are changed for each time period, first scheduling information for a first time period is generated based on the communication qualities in the first time period, and second scheduling information for a second time period after the first time period is generated based on the communication qualities in the second time period.

12. The method of claim 10, wherein the communication quality between the base station and the satellite is predicted further considering at least one of a noise level at the base station, a noise level at the satellite, or a third length of a new feeder link between the satellite and a new base station, and the communication quality between the satellite and the terminal is predicted further considering at least one of the maximum transmit power of the terminal, a polarization loss between the satellite and the terminal, or a noise level at the satellite.

13. The method of claim 10, wherein the scheduling information includes at least one of information on a time period, information of a number of repetitions for uplink transmission, uplink resource allocation information, demodulation reference signal (DMRS) information, modulation and coding scheme (MCS) information, or information on an uplink transmission periodicity.

14. A base station comprising a processor, wherein the processor causes the base station to perform:

predicting, by the processor, a first length of a feeder link between the base station and a satellite connected to the base station;

predicting, by the processor, a second length of a service link between the satellite and a terminal connected to the satellite;

predicting, by the processor, a first communication quality for the feeder link considering the first length;

predicting, by the processor, a second communication quality for the service link considering the second length;

generating, by the processor, scheduling information based on the first communication quality and the second communication quality;

transmitting, by the processor, the scheduling information to the terminal through the satellite; and performing, by the processor, uplink communication with the terminal based on the scheduling information.

15. The base station of claim 14, wherein the processor further causes the base station to perform: receiving indication information of a maximum transmit power of the terminal, wherein the indication information is received in an initial access procedure or a handover procedure for the terminal.

16. The base station of claim 14, wherein the first length for one or more time periods is predicted based on ephemeris information of the satellite, and the second length for the one or more time period is predicted based on at least one of the ephemeris information of the satellite or location information of the terminal.

17. The base station of claim 14, wherein the scheduling information is generated for each time period, at least one of the first communication quality or the second communication quality is changed for each time period, first scheduling information for a first time period is generated based on the first communication quality and the second communication quality in the first time period, and second scheduling information for a second time period after the first time period is generated based on the first communication quality and the second communication quality in the second time period.

18. The base station of claim 14, wherein the first communication quality is predicted further considering at least one of a noise level at the base station, a noise level at the satellite, or a third length of a new feeder link between the satellite and a new base station.

19. The base station of claim 14, wherein the second communication quality is predicted further considering at least one of the maximum transmit power of the terminal, a polarization loss between the satellite and the terminal, or a noise level at the satellite.

20. The base station of claim 14, wherein the scheduling information includes at least one of information on a time period, information of a number of repetitions for uplink transmission, uplink resource allocation information, demodulation reference signal (DMRS) information, modulation and coding scheme (MCS) information, or information on an uplink transmission periodicity.

* * * * *